US012724457B2

(12) United States Patent
Choi et al.

(10) Patent No.: US 12,724,457 B2
(45) Date of Patent: Sep. 1, 2026

(54) ELECTRONIC DEVICE AND METHOD FOR CONTROLLING AUDIO OUTPUT AND HAPTIC MOTOR IN ELECTRONIC DEVICE

(71) Applicant: Samsung Electronics Co., Ltd., Suwon-si (KR)

(72) Inventors: Jaejoon Choi, Suwon-si (KR); Kyeongmin Kim, Suwon-si (KR); Shonguk Shin, Suwon-si (KR); June Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 18/906,244

(22) Filed: Oct. 4, 2024

(65) Prior Publication Data

US 2025/0117042 A1 Apr. 10, 2025

Related U.S. Application Data

(63) Continuation of application No. PCT/KR2024/014887, filed on Sep. 30, 2024.

(30) Foreign Application Priority Data

Oct. 5, 2023 (KR) ........................ 10-2023-0132849
Dec. 11, 2023 (KR) ........................ 10-2023-0179084

(51) Int. Cl.
*G06F 1/16* (2006.01)
*G06F 3/16* (2006.01)

(52) U.S. Cl.
CPC .......... *G06F 1/1635* (2013.01); *G06F 1/1688* (2013.01); *G06F 3/162* (2013.01); *G06F 3/165* (2013.01)

(58) Field of Classification Search
CPC ...... G06F 1/1635; G06F 1/1688; G06F 3/162; G06F 3/165
(Continued)

(56) References Cited

U.S. PATENT DOCUMENTS 7,643,264 B2 1/2010 Shinobu
8,660,435 B2 2/2014 Chan et al.
(Continued)

FOREIGN PATENT DOCUMENTS

JP 2008177887 A 7/2008
JP 5102257 B2 10/2012
(Continued)

OTHER PUBLICATIONS

Search Report and Written Opinion dated Jan. 6, 2025 issued in International Patent Application No. PCT/KR2024/014887.

*Primary Examiner* — Kerri L Mcnally
(74) *Attorney, Agent, or Firm* — Nixon & Vanderhye, P.C.

(57) ABSTRACT

An electronic device according to an embodiment may include: a battery, a haptic motor, a speaker, haptic motor driving circuitry, audio circuitry, at least one processor, comprising processing circuitry, and memory storing instructions, wherein the at least one processor, individually and/or collectively, is configured to execute the instructions and to cause the electronic device to: output, through the speaker, audio signals corresponding to audio data using the audio circuitry, based on haptic signals being output concurrently with output of audio signals through the speaker, identify the audio signals to be output and the haptic signals to be output, estimate a discharge current value of the battery associated with the audio signals to be output concurrently with output of the haptic signals, and, based on the estimated discharge current value exceeding a specified discharge current value, adjust volume associated with the audio (Continued)

signals to be output and/or a driving voltage for driving the haptic motor in association with the haptic signals to be output such that the discharge current value of the battery due to the output of the audio signals and haptic signals does not exceed the specified discharge current value.

20 Claims, 18 Drawing Sheets

(58) Field of Classification Search
USPC ........................................................ 340/407.1
See application file for complete search history.

(56) References Cited

U.S. PATENT DOCUMENTS

2002/0126432 A1* 9/2002 Goldenberg ............ G06F 3/016 361/103
2010/0027169 A1 2/2010 Knott et al.
2013/0265286 A1 10/2013 Da Costa et al.
2018/0077491 A1 3/2018 Butler et al.
2018/0151036 A1 5/2018 Cha et al.
2018/0229116 A1* 8/2018 Rihn ....................... G06F 3/016
2019/0354186 A1* 11/2019 Bae ......................... G06F 3/016
2021/0120351 A1* 4/2021 Zhao ....................... G06F 1/325
2021/0258679 A1 8/2021 Li et al.
2022/0026494 A1* 1/2022 Lee .................... G01R 31/3835
2024/0362983 A1 10/2024 Kim et al.

FOREIGN PATENT DOCUMENTS

JP 6373561 B2 7/2018
JP 6515200 B2 4/2019
KR 20100103101 A 9/2010
KR 20110104525 A 9/2011
KR 20170024351 A 3/2017
KR 10-2018-0062174 6/2018
KR 10-2018-0083710 7/2018
KR 10-2020-0058067 5/2020
KR 10-2023-0116618 8/2023

* cited by examiner

ELECTRONIC DEVICE AND METHOD FOR CONTROLLING AUDIO OUTPUT AND HAPTIC MOTOR IN ELECTRONIC DEVICE

CROSS-REFERENCE TO RELATED APPLICATIONS

This application is a continuation of International Application No. PCT/KR2024/014887 designating the United States, filed on Sep. 30, 2024, in the Korean Intellectual Property Receiving Office and claiming priority to Korean Patent Application Nos. 10-2023-0132849, filed on Oct. 5, 2023, and 10-2023-0179084, filed on Dec. 11, 2023, in the Korean Intellectual Property Office, the disclosures of each of which are incorporated by reference herein in their entireties.

BACKGROUND

Field

The disclosure relates to a method for controlling audio output and a haptic motor in electronic devices.

Description of Related Art

Recently, portable electronic devices powered by batteries have been widely used. Batteries may have various capacities, so small batteries with lower capacity may be used in small electronic devices and large batteries with higher capacity may be used in large electronic devices.

The battery capacity of portable electronic devices may be measured in units of mAh (or Ah), and the battery fully charged to 1 Ah may provide current of 1 A for 1 hour. The supply of current from the battery may be called discharge, and a discharge rate of the battery may be defined as a C-rate. 1 C may indicate 1 hour of discharge, and 0.5 C may indicate 2 hours of discharge. For example, 1 C of a battery with 100 mAh capacity may indicate discharging total current of 100 mA for 1 hour, and the C value may be obtained by dividing the discharge current by the battery's rated capacity (the amount of current that may be used in 1 hour). Since the instantaneous current consumption may differ between electronic devices, batteries with different C values may be used for the respective electronic devices.

The higher the discharge rate, the more current the battery may provide at once, but portable electronic devices (e.g., small electronic devices, wearable electronic devices, or smart watches) may use a small battery with a small capacity, in which the maximum allowable discharge current value is relatively low, for the convenience of carrying.

When the current consumed instantaneously in an electronic device is more than a predefined (or configured) discharge current (e.g., the maximum allowable discharge current), the lifespan of the battery may be shortened or heat generation may increase, so the current consumed in the electronic device may need to be lowered than the maximum allowable discharge current.

For example, the amount of current consumed at one time when a haptic motor driving operation and an audio output operation are performed simultaneously (or together) in a small electronic device (e.g., a smart watch), which includes a motor (e.g., a haptic motor) and a speaker, may be greater than that when the haptic motor driving operation and the audio output operation are separately performed, and may exceed the maximum allowable discharge current. Technology to lower the amount of current consumed may be necessary for the case where the amount of current consumed at once is greater than the maximum allowable discharge current when the haptic motor driving operation and the audio output operations are to be performed simultaneously (or together) in small electronic devices.

When the haptic motor driving operation and the audio output operation are required to be performed simultaneously, the haptic motor driving operation and the audio output operation may be alternately performed in time division to reduce the amount of current consumed at once, but it may not be possible to adjust the sum of the current consumed due to the instantaneous haptic motor driving operation and the current consumed due to the audio output operation to be less than the maximum allowable discharge current.

SUMMARY

According to an example embodiment, an electronic device may include: a battery, a haptic motor, a speaker, haptic motor driving circuitry, audio circuitry, at least one processor, comprising processing circuitry, and memory storing instructions. At least one processor, individually and/or collectively, may be configured to execute the instructions and to cause the electronic device to: output, through the speaker, audio signals corresponding to audio data using the audio circuitry; identify, based on haptic signals being output concurrently with the output of the audio signals through the speaker, the audio signals to be output and the haptic signals to be output; estimate a discharge current value of the battery associated with the audio signals to be output concurrently with output of the haptic signals; adjust, based on the estimated discharge current value exceeding a specified discharge current value, a volume associated with the audio signals to be output and/or a driving voltage for driving the haptic motor in association with the haptic signals to be output such that the discharge current value of the battery due to the output of the audio signals and haptic signals does not exceed the specified discharge current value.

A method of controlling audio output and a haptic motor in an electronic device according to an example embodiment may include: outputting, through a speaker, audio signals corresponding to audio data using audio circuitry; identifying, based on haptic signals being output concurrently with the output of the audio signals through the speaker, the audio signals to be output and the haptic signals to be output; estimating a discharge current value of a battery associated with the audio signals to be output concurrently with the output of the haptic signals to be output; based on the estimated discharge current value exceeding a specified discharge current value, adjusting a volume associated with the audio signals to be output and/or a driving voltage for driving the haptic motor in association with the haptic signals to be output such that the discharge current value of the battery due to the output of the audio signals and haptic signals does not exceed the specified discharge current value.

A non-transitory computer-readable storage medium according to an example embodiment may store instructions that, when executed by at least one processor, individually and/or collectively, of an electronic device, cause the electronic device to perform at least one operation, the at least one operation comprising: outputting, through a speaker, audio signals corresponding to audio data using audio circuitry; identifying, based on haptic signals being output concurrently with the output of the audio signals through the speaker, the audio signals to be output and the haptic signals to be output; estimating a discharge current value of a battery associated with the audio signals to be output concurrently with the output of the haptic signals to be output; based on the estimated discharge current value exceeding a specified discharge current value, adjusting a volume associated with the audio signals to be output and/or a driving voltage for driving the haptic motor in association with the haptic signals to be output such that the discharge current value of the battery due to the output of the audio signals and haptic signals does not exceed the specified discharge current value.

According to an example embodiment, an electronic device capable of adjusting the sum of a current consumed due to the haptic motor driving operation and a current consumed due to the audio output operation to be less than the maximum allowable discharge current when the haptic motor driving operation and the audio output operation are required to be performed simultaneously, and a method for controlling audio output and a haptic motor in the electronic device may be provided.

According to an example embodiment, an electronic device capable of adjusting the volume of audio data to be output through a speaker and/or the haptic motor driving voltage of haptic motor driving circuitry such that the sum of a current consumed due to the haptic motor driving operation and a current consumed due to the audio output operation is below the maximum allowable discharge current when the haptic motor driving operation and the audio output operation are required to be performed simultaneously, and a method for controlling audio output and a haptic motor in the electronic device may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, an electronic device according to various embodiments will be described in greater detail with reference to the accompanying drawings. As used in various embodiments, the term "user" may refer to a person who uses an electronic device or a device (e.g., artificial intelligence electronic device) which uses an electronic device.

The terms used in the disclosure are merely used to describe various embodiments, and may not be intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 1:
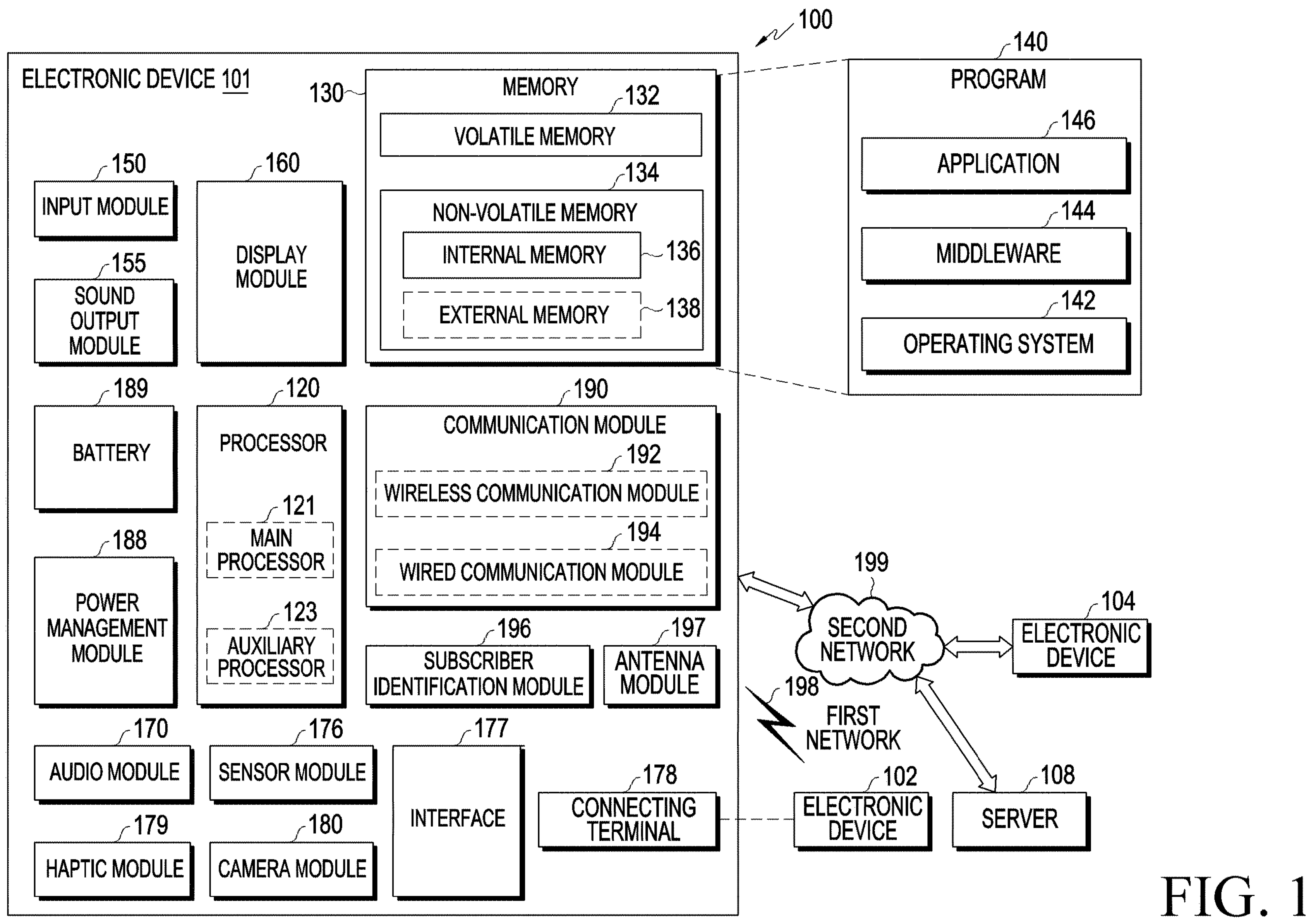
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (cMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device (e.g., the electronic device 101 in FIG. 1) according to an embodiment may have the structure of a wearable electronic device. According to an embodiment, the electronic device 101 may be a wearable electronic device in the form of a watch, and the electronic device 101 according to an embodiment may be worn on a user. For example, the electronic device 101 may be a smart watch that may be worn on the user's wrist.

Figure 2A:
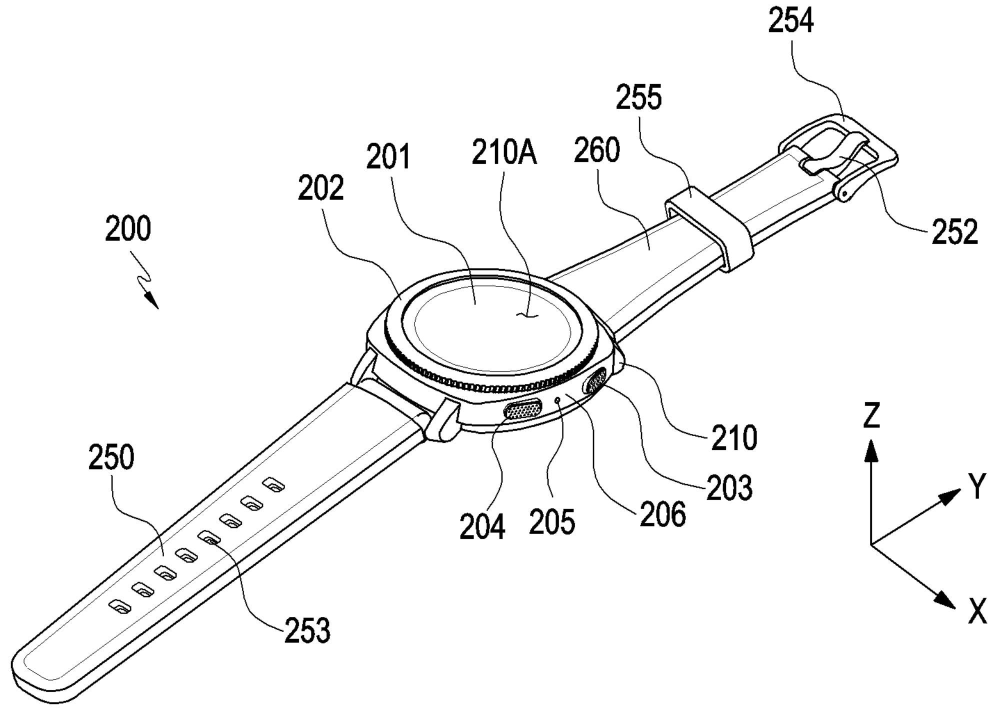
FIG. 2A is a front perspective view of an example electronic device according to various embodiments.
Figure 2B:
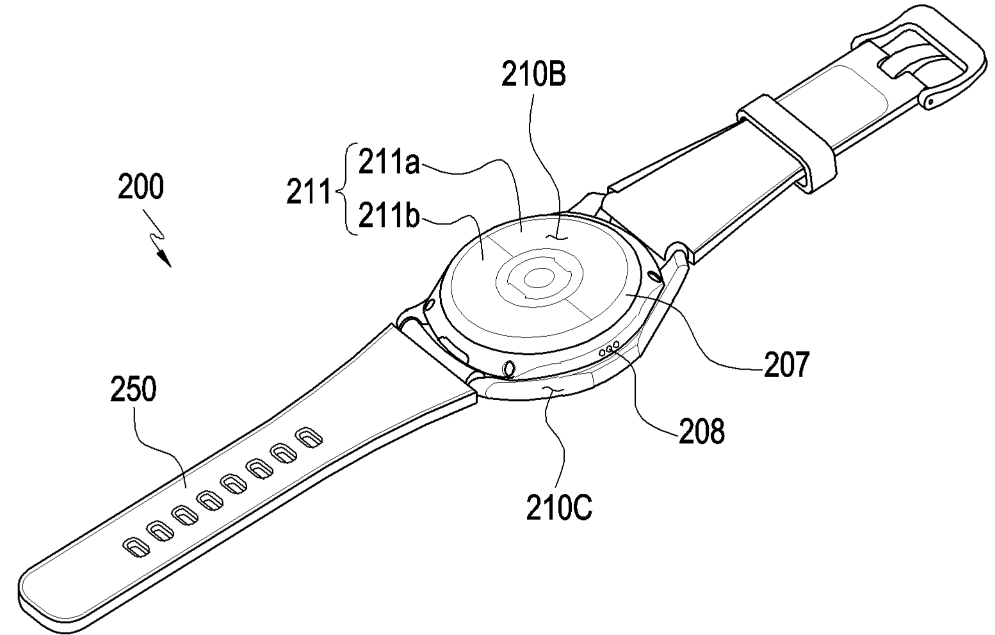
FIG. 2B is a rear perspective view of an example electronic device according to various embodiments.

FIG. 2A is a front perspective view of an example electronic device according to various embodiments, and FIG. 2B is a rear perspective view of an example electronic device according to various embodiments.

Referring to FIGS. 2A and 2B, an electronic device 200 (e.g., the electronic device 101 in FIG. 1) according to an embodiment may be a wearable device (e.g., a smart watch). The electronic device 200 according to an embodiment may include a housing 210 including a front surface 210A, a rear surface 210B, and a side surface 210C surrounding a space between the front surface 210A and the rear surface 210B, and fastening members 250 and 260 coupled to at least a part of the housing 210 and configured to detachably fasten the electronic device 200 to a user's body part (e.g., wrist, ankle, or the like). In an embodiment (not shown), the housing may refer to a structure forming some of the front surface 210A, the rear surface 210B, and the side surface 210C in FIG. 2A. According to an embodiment, the front surface 210A may be formed by a front plate 201 (e.g., a glass plate or polymer plate including various coating layers) that is substantially transparent at least in part. The rear surface 210B may be formed by a rear cover 207 that is substantially opaque. The rear cover 207 may be formed of, for example, coated or tinted glass, ceramic, polymer, metal (e.g., aluminum, stainless steel (STS), or magnesium), or a combination of at least two of the above materials. The side surface 210C may be formed by a side bezel structure (or "side member") 206 coupled to the front plate 201 and the rear cover 207 and including metal and/or polymer. In a certain embodiment, the rear cover 207 and the side bezel structure 206 may be integrally formed and may include the same material (e.g., a metal material such as aluminum). The fastening members 250 and 260 may be formed of various materials and shapes. They may be formed integrally or such that a plurality of unit links is movable relative to each other by a woven material, leather, rubber, urethane, metal, ceramic, or a combination of at least two of the above materials.

According to an embodiment, the electronic device 200 may include at least some or all of the elements shown in FIG. 1, including a display 220 (the display 160 in FIG. 1). In a certain embodiment, the electronic device 200 may exclude at least one of the elements included in FIG. 1 or further include other elements.

The display 220 according to an embodiment may be visible, for example, through a substantial portion of the front plate 201. The display 220 may have a shape corresponding to the shape of the front plate 201, such as a circular shape, an elliptical shape, or a polygonal shape. The display 220 may be connected to a touch detection circuit, a pressure sensor capable of measuring the intensity (pressure) of a touch, and/or a fingerprint sensor or disposed adjacent thereto.

A microphone for obtaining external sound may be disposed inside a microphone hole 205 (e.g., the audio output module 155 in FIG. 1), and in a certain embodiment, a plurality of microphones may be disposed to detect the direction of sound. A speaker hole 208 (e.g., the audio output module 155 in FIG. 1) may be used as an external speaker and a receiver for a call. In a certain embodiment, the speaker hole 208 and the microphone hole 205 may be implemented as one hole, or a speaker may be included without the speaker hole 208 (e.g., a piezo speaker).

The sensor module 211 (e.g., the sensor module 176 in FIG. 1) may generate an electrical signal or data value corresponding to an internal operation state of the electronic device 200 or an external environmental state. The sensor module 211 may include, for example, a biometric sensor module 211 (e.g., an HRM sensor) disposed on the rear surface 210B of the housing 210. According to an embodiment, the sensor module 211 may include a plurality of biometric sensors 211*a* and 211*b*. The electronic device 200 may further include a sensor module that is not shown, for example, at least one of a gesture sensor, a gyro sensor, an atmosphere pressure sensor, a magnetic sensor, an acceleration sensor, a grip sensor, a color sensor, an infrared (IR) sensor, a biometric sensor, a temperature sensor, a humidity sensor, and an illuminance sensor. According to an embodiment, the sensor module 211 may include a pressure sensor that measures, when the user wears the electronic device 200, the intensity of pressure applied to the electronic device 200 depending on the degree of close contact between the user's body part on which the electronic device 200 is worn and the electronic device 200. According to an embodiment, a processor (e.g., the processor 120 in FIG. 1) may determine biometric signals (e.g., electrocardiogram signals or heart rate signals), based on the signals acquired from the sensor module 211.

The key input devices 202, 203, and 204 (e.g., the input module in FIG. 1) according to an embodiment may include a wheel key 202 disposed on the front surface 210A of the housing 210 and rotatable in at least one direction, and/or side key buttons 202 and 203 disposed on the side surface 210C of the housing 210. The wheel key may have a shape corresponding to the shape of the front plate 202. In an embodiment, the electronic device 200 may exclude some or all of the above-mentioned key input devices 202, 203, and 204, and the excluded key input devices 202, 203, and 204 may be implemented in another form such as soft keys on the display 220.

The connector hole 209 (e.g., the connection terminal 178 in FIG. 1) according to an embodiment may receive a connector (e.g., a USB connector) for transmitting and receiving power and/or data to and from an external electronic device (e.g., the electronic device 102 in FIG. 1), and another connector hole (not shown) for receiving a connector for transmitting and receiving an audio signal to and from an external electronic device may be included. The electronic device 200 may further include, for example, a connector cover (not shown) that covers at least a portion of the connector hole 209 and prevents and/or blocks foreign substances from entering the connector hole.

The fastening members 250 and 260 according to an embodiment may be detachably attached to at least a part of the housing 210 using a hinge structure. The fastening members 250 and 260 may include one or more of a fixing member 252, a fixing member fastening hole 253, a band guide member 254, and a band fixing ring 255.

The fixing member 252 according to an embodiment may be configured to fix the housing 210 and the fastening members 250 and 260 to a user's body part (e.g., wrist, ankle, or the like). The fixing member fastening hole 253 may fix the housing 210 and the fastening members 250 and 260 to a user's body part, corresponding to the fixing member 252. The band guide member 254 may be configured to limit the movement range of the fixing member 252 when the fixing member 252 is fastened with the fixing member fastening hole 253, so that the fastening members 250 and 260 may be tightly attached to a user's body part. The band fixing ring 255 may limit the movement range of the fastening members 250 and 260 when the fixing member 252 and the fixing member fastening hole 253 are fastened.

Figure 3:
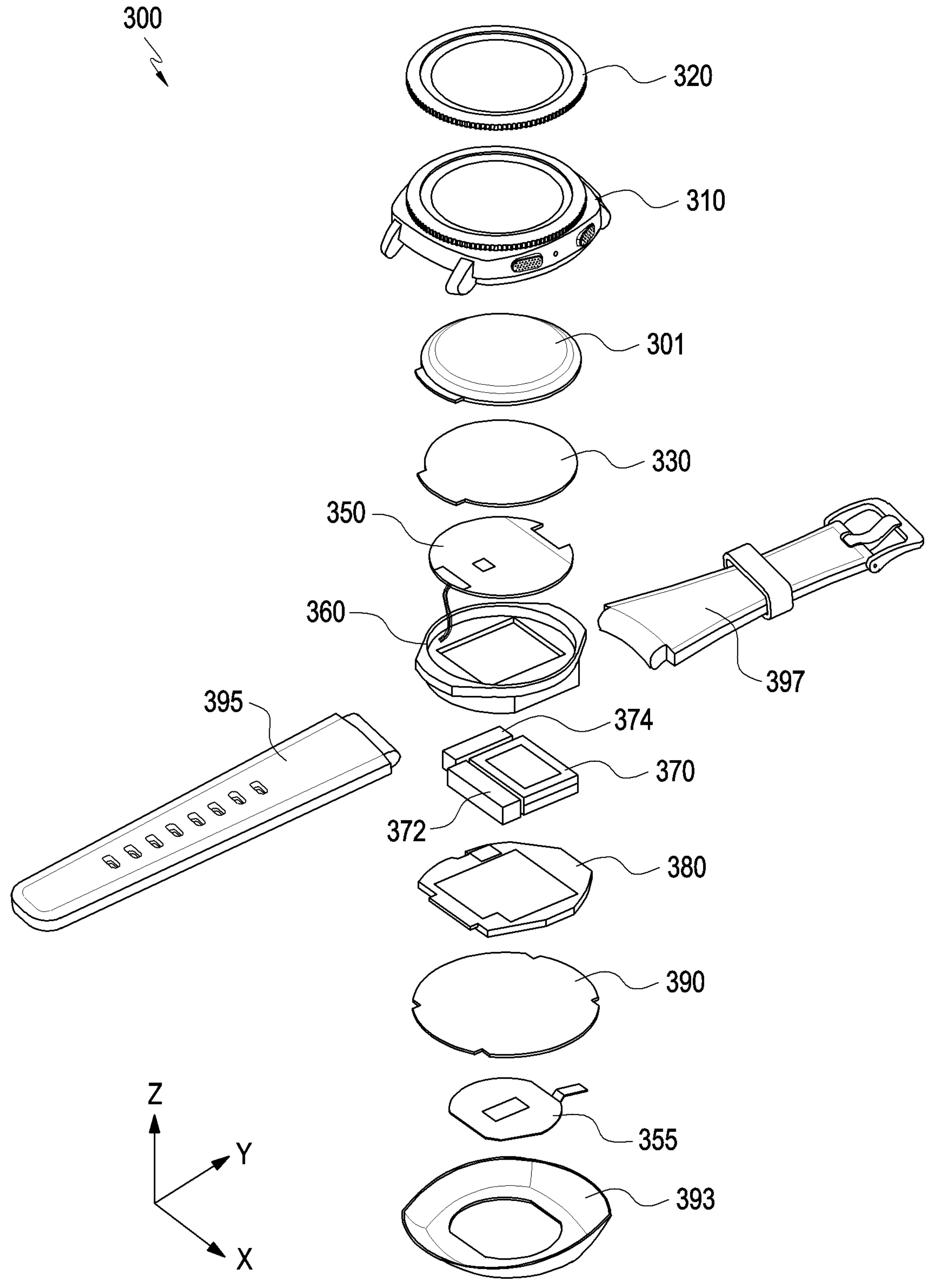
FIG. 3 is an exploded perspective view of an example electronic device according to various embodiments.

FIG. 3 is an exploded perspective view of an electronic device according to various embodiments.

Referring to FIG. 3, an electronic device 300 (e.g., the electronic device 101 in FIG. 1) according to an embodiment may include a side bezel structure 310, a wheel key 320, a front plate 301, a display 330, a first antenna 350, a second antenna 355, a support member 360 (e.g., a bracket), a battery 370, a haptic motor 372, a speaker 374, a first printed circuit board 380, a sealing member 390, a rear plate 393, and fastening members 395 and 397. At least one of the elements of the electronic device 200 may be the same as or similar to at least one of the elements of the electronic device 200 in FIG. 2A or 2B, and redundant descriptions thereof will be omitted below. The support member 360 may be disposed inside the electronic device 300 to be connected to the side bezel structure 310 or integrally formed with the side bezel structure 310. The support member 360 may be formed of, for example, a metal material and/or a non-metal (e.g., polymer) material. The support member 360 may have the display 330 coupled to one side thereof and the first printed circuit board 380 coupled to the other side. A processor (e.g., the processor 120 in FIG. 1), memory (e.g., the memory 130 in FIG. 1), and/or an interface (e.g., the interface 177 in FIG. 1) may be mounted on the first printed circuit board 380.

At least a portion of the battery 370 (e.g., the battery 189 in FIG. 1) according to an embodiment may be disposed on substantially the same plane as, for example, the first printed circuit board 380. The battery 370 may be integrally disposed in a space formed by the support member 360 inside the electronic device 300 or may be disposed detachably from the electronic device 300.

The haptic motor 372 (e.g., the haptic module 179 in FIG. 1) according to an embodiment may be disposed together with the battery 370 in the inner space of the electronic device 300. The speaker 374 (e.g., the audio output module 155 in FIG. 1) according to an embodiment may be disposed close to the speaker hole (e.g., the speaker hole 208 in FIG. 2B).

According to an embodiment, the first antenna 350 may be disposed between the display 330 and the support member 360. For example, the first antenna 350 may transmit or receive wireless RF signals to or from the outside (e.g., an external electronic device). According to an embodiment, the first antenna 350 may include an antenna including a radiator made of a conductor or a conductive pattern. According to an embodiment, the first antenna 350 may include a plurality of antennas (e.g., an array antenna), and at least one antenna suitable for a communication scheme used in a communication network may be selected from the plurality of antennas by, for example, the communication module 190. In an embodiment, an antenna structure may be formed by a part of the side bezel structure 310 and/or the support member 360 or a combination thereof.

The second antenna 355 according to an embodiment may be disposed between the circuit board 380 and the rear plate 393. The second antenna 355 may include, for example, a near-field communication (NFC) antenna, a wireless charging antenna, and/or a magnetic secure transmission (MST) antenna. For example, the second antenna 355 may perform short-range communication with an external device, wirelessly transmit and receive power required for charging, and transmit a short-range communication signal or a magnetic-based signal including payment data.

The sealing member 390 according to an embodiment may be positioned between the side bezel structure 310 and the rear plate 393. The sealing member 390 may be configured to prevent/block moisture and foreign substances from entering into a space surrounded by the side bezel structure 310 and the rear plate 393 from the outside.

According to an embodiment, in the electronic device 300 (e.g., the electronic device 101 in FIG. 1 or the electronic device 200 in FIGS. 2A and 2B), in the case where a haptic motor 372 of high-voltage power is used in a small electronic device (e.g., a wearable electronic device or a smart watch) shown in FIGS. 2A, 2B, and 3, when the high-voltage power motor and other elements (e.g., the speaker 374) operate together, the amount of current used (or consumed) instantaneously may increase significantly and exceed the maximum allowable discharge current.

For example, the amount of current consumed at once when a motor driving operation and an audio output operation by the haptic motor 372 and the speaker 374 are performed simultaneously (or together) in the electronic device 300 (e.g., the electronic device 101 in FIG. 1 or the electronic device 200 in FIGS. 2A and 2B) may be greater than that when the motor driving operation and the audio output operation are separately performed, and may exceed the maximum allowable discharge current. It may be necessary to lower the amount of current consumed for the case where the amount of current consumed at once is greater than the maximum allowable discharge current when the motor driving operation and the audio output operations are to be performed simultaneously (or together) in small electronic devices.

Figure 4:
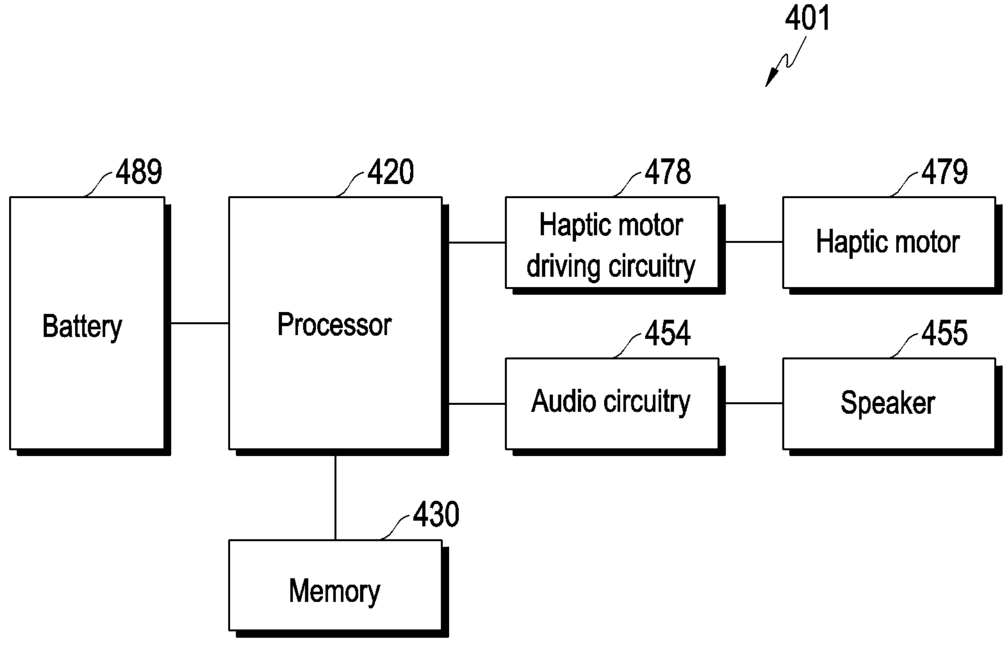
FIG. 4 is a block diagram illustrating an example configuration of an electronic device according to various embodiments.

FIG. 4 is a block diagram illustrating an example configuration of an electronic device according to various embodiments.

Referring to FIG. 4, an electronic device 401 (e.g., the electronic device 101 in FIG. 1, the electronic device 200 in FIGS. 2A and 2B, or the electronic device 300 in FIG. 3) according to an embodiment may include a processor (e.g., including processing circuitry) 420 (e.g., the processor 120 in FIG. 1), memory 430 (e.g., the memory 130 in FIG. 1), audio circuitry 454, a speaker 455 (e.g., the audio output module 455 in FIG. 1), haptic motor driving circuitry 478, a haptic motor 479 (e.g., the haptic module 179 in FIG. 1), and/or a battery 489 (e.g., the battery 189 in FIG. 1). The electronic device 401 according to an embodiment is not limited to this and may be configured to further include various elements or to exclude some of the elements. The electronic device 401 according to an embodiment may further include all or some configurations of the electronic device 101 shown in FIG. 1.

The processor 420 according to an embodiment may include an application processor. The processor 420 according to an embodiment may include various processing circuitry and perform control overall operations of the electronic device 401. The processor 420 according to an embodiment may execute instructions stored in the memory 430 to perform at least one operation or cause the electronic device 401 to perform at least one operation. The processor 420 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 420 according to an embodiment may generate a haptic motor driving control signal (or haptic control signal or haptic motor driving waveform) corresponding to haptic motor driving data (or haptic control data), based on a haptic motor driving (or haptic control) event, and transmit the haptic motor driving control signal to the haptic motor driving circuitry 478. The processor 420 according to an embodiment may transmit audio data corresponding to a sound source to be output, based on an audio output event, to the audio circuitry 454.

The processor 420 according to an embodiment may identify the state in which a haptic motor driving operation and an audio output operation are performed. The processor 420 according to an embodiment may identify the state in which the haptic motor driving operation and the audio output operation are (or are to be) performed simultaneously (or together). The haptic motor driving operation according to an embodiment may be an operation of driving the haptic motor 479 by providing a haptic motor driving control signal (or haptic signals) to the haptic motor driving circuitry 478. The audio output operation according to an embodiment may be an operation of providing audio data to the audio circuitry 454 and outputting audio signals through the speaker 455.

The processor 420 according to an embodiment may identify audio signals to be output and haptic signals to be output, based on identification of the state in which the haptic motor driving operation and the audio output operation are (or are to be) performed simultaneously. The processor 420 according to an embodiment may output audio signals corresponding to audio data through the speaker 455 using the audio circuitry 454 and, when haptic signals are (or are to be) output simultaneously with the output of the audio signals through the speaker 455, identify audio signals to be output and haptic signals to be output.

The processor 420 according to an embodiment may estimate a discharge current value of the battery associated with the audio signals to be output concurrently with the output of the haptic signals. The discharge current value of the battery 489 according to an embodiment may be the discharge current value to be discharged (or provided) from the battery 489 when the processor 420 performs the haptic motor driving operation and the audio output operation together (or simultaneously). The processor 420 according to an embodiment may estimate a first battery discharge current value when performing an audio output operation using estimated battery discharge current value information depending on the volume (e.g., dB) when outputting audio signals through the speaker 455. The processor 420 according to an embodiment may estimate a second battery discharge current value when performing the haptic motor driving operation using estimated battery discharge current value information depending on the haptic motor 479 driving voltage when outputting haptic signals through the haptic motor 479. When performing the haptic motor driving operation and the audio output operation together (or simultaneously), the processor 420 according to an embodiment may estimate the first battery discharge current value and the second battery discharge current value, and estimate the sum of the estimated first battery discharge current value and the estimated second battery discharge current value as the discharge current value of the battery 489 when the haptic motor driving operation and the audio output operation are performed together (or simultaneously).

When the estimated discharge current value exceeds a predefined discharge current value, the processor 420 according to an embodiment may adjust the volume associated with the audio signals to be output and/or adjust the driving voltage for driving the haptic motor 479 in association with the haptic signals to be output such that the discharge current value of the battery for outputting the audio signals and the haptic signals does not exceed the predefined discharge current value. The predefined discharge current value according to an embodiment may include the maximum allowable discharge current value of the battery 489. For example, the maximum allowable discharge current value of battery 489 may be a current value based on a predetermined maximum output power value (or output power limit value) based on the capacity of the battery 489 (or the C-value of the battery 489).

The processor 420 according to an embodiment may lower the predefined discharge current value of the battery 489 by a specified value, based on specified conditions (e.g., voltage drop or battery performance deterioration condition) and use the discharge current value lowered by the specified value.

When a discharge current value of the battery 489, which is estimated in the state in which the haptic motor driving operation and the audio output operation are (or are to be) performed simultaneously, exceeds a predefined discharge current value, the processor 420 according to an embodiment may select whether to adjust the volume associated with the audio signals to be output, adjust the driving voltage for driving the haptic motor 479 in association with the haptic signals to be output, or adjust the volume and the driving voltage.

When a discharge current value of the battery 489, which is estimated in the state in which the haptic motor driving operation and the audio output operation are (or are to be) performed simultaneously, exceeds a predefined discharge current value, the processor 420 according to an embodiment may identify a first state configured to adjust the volume associated with the audio signals to be output, a second state configured to adjust the driving voltage for driving the haptic motor 479 in association with the haptic signals to be output, or a third state configured to adjust the volume and the driving voltage.

When the first state configured to adjust the volume is identified, the processor 420 according to an embodiment may adjust the volume associated with the audio signals to be output using a specified volume control ratio, adjust the volume associated with the audio signals to be output using the inverted value of a current value to be provided to the haptic motor 479, or adjust the volume associated with the audio signals to be output using a specified volume limit value based on a current value to be provided to the haptic motor 479.

When the second state configured to adjust the driving voltage for driving the haptic motor 479 in association with the haptic signals to be output is identified, the processor 420 according to an embodiment may adjust the driving voltage using a specified haptic motor driving voltage ratio, adjust the driving voltage using a specified haptic motor driving voltage limit value, or adjust the driving voltage using the inverted volume of the volume associated with the audio signals to be output through the speaker 455.

When the third state configured to adjust the volume associated with the audio signals to be output and the driving voltage for driving the haptic motor 479 in association with the haptic signals to be output, the processor 420 according to an embodiment may obtain a ratio (B/A) of a pre-specified discharge current value (B) (e.g., the maximum allowable discharge current value of battery) to a discharge current value (A) estimated during the haptic motor driving operation and the audio output operation (e.g., the sum of the estimated current value to be provided to the speaker 455 and the estimated current value to be provided to the haptic motor 479), adjust the driving voltage by multiplying the ratio (B/A) by the driving voltage to drive the haptic motor 479, and adjust the volume by multiplying the ratio (B/A) by the volume associated with the audio signals to be output.

The first state configured to adjust the volume associated with the audio signals to be output according to an embodiment may include a state in which the haptic motor 479 performs a vibrating operation (or haptic operation) of maximum intensity (or a state of performing a vibrating operation or a haptic operation using power exceeding specified power). According to an embodiment, the processor 420 may perform a vibrating operation (or haptic operation) of maximum intensity (or perform a vibrating operation or haptic operation using power exceeding the specified power) when performing a specified first notification. According to an embodiment, the specified first notification may include a notification that the user is (necessarily) required to recognize (via vibration or haptics). According to an embodiment, the specified first notification may be specified when manufacturing the electronic device 401 or may be configured (or designated) by the user (user input or user selection). According to an embodiment, the specified first notification may include notifications related to diving while the user is diving (e.g., diving time, hypothermia, diving depth, or other notifications related to diving), notifications related to noise exposure (e.g., noise level, duration of noise exposure, potential hearing loss based on duration of noise exposure, or other notifications associated with noise exposure) while the user is exposed to a noisy environment for a long period of time, notifications related to disasters (e.g., earthquakes, wildfires, typhoons, tsunamis, heavy rain, heavy snow, or other notifications related to disasters), or notifications configured by the user to output the maximum vibration or haptics (e.g., important text or important notifications).

The second state configured to adjust the driving voltage for driving the haptic motor 479 in association with the haptic signals to be output according to an embodiment may include a state in which the electronic device 401 performs an audio output operation at the maximum level (or volume) (or a state of performing an audio output operation using power exceeding specified power). According to an embodiment, the processor 420 may perform an audio output operation at the maximum level (or volume) (or perform an audio output operation using power exceeding the specified power) when performing a specified second notification. According to an embodiment, the specified second notification may include notifications that other people, as well as the user, are (necessarily) required to recognize (via audio output). According to an embodiment, the specified second notification may include notifications related to the user's emergency situation (e.g., trip, fall, collision, or other emergency situations), self-defense notifications (e.g., a siren in an emergency situation threatened by a suspicious person), notifications related to finding an electronic device, or other notifications configured by the user to maximize and/or increase audio output.

The third state configured to adjust the volume associated with the audio signals to be output and the driving voltage for driving the haptic motor 479 associated with the haptic signals to be output according to an embodiment may include a state where, when the haptic motor driving operation and the audio output operation are performed, the vibrating operation of the haptic motor 479 is performed at an intensity other than the maximum intensity and the audio output operation is also performed at a level other than the maximum level (or volume) but where the discharge current value estimated in relation to the vibrating operation of the haptic motor 479 and the audio output operation is predicted to exceed a pre-specified discharge current value.

The memory 430 (e.g., the memory 130 in FIG. 1) according to an embodiment may include various data used by at least one element (e.g., the processor 420, the haptic motor driving circuitry 478, and/or the audio circuitry 454) of the electronic device 401. The memory 430 according to an embodiment may store various audio data that may be output through the speaker 455, and may store various haptic motor control signals (waveforms or patterns) capable of operating the haptic motor 479. The memory 430 according to an embodiment may store instructions executable by the processor 420. The instructions according to an embodiment may be configured to cause, when executed by the processor 420, the electronic device 401 or the processor 420 to identify a state in which a haptic motor driving operation and an audio output operation are to be performed and, based on a discharge current value of the battery 489, which is estimated (predicted) when the haptic motor driving operation and audio output operation are performed, exceeding a predefined discharge current value (or the estimated discharge current value of the battery 489 exceeding the maximum allowable discharge current value of the battery 489), adjust the volume associated with audio signals to be output through the speaker 455 or adjust the driving voltage of the haptic motor driving circuitry 478 for driving the haptic motor 479 in association with haptic signals to be output such that the discharge current value of the battery 489 due to the haptic motor driving operation and the audio output operation is equal to or less than the predefined discharge current value.

The audio circuitry 454 according to an embodiment may include an audio integrated chip (IC). The audio circuitry 454 according to an embodiment, based on receiving audio data from the processor 420, may apply an audio output voltage corresponding to the received audio data to the speaker 455. The speaker 455 according to an embodiment may output an analog audio signal (or sound) based on the audio output voltage.

The haptic motor driving circuitry 478 according to an embodiment may include a haptic motor driver integrated chip (IC). The haptic motor driving circuitry 478 according to an embodiment, based on a haptic motor driving control signal (or haptic control signal or haptic motor driving waveform) from the processor 420, may boost and output a haptic motor driving voltage. The haptic motor 479 according to an embodiment may vibrate or perform a haptic operation by receiving the boosted haptic motor driving voltage.

An electronic device (e.g., the electronic device 101 in FIG. 1, the electronic device 200 in FIGS. 2A and 2B, the electronic device 300 in FIG. 3, or the electronic device 401 in FIG. 4) according to an example embodiment may include: a battery (e.g., the battery 189 in FIG. 1 or the battery 489 in FIG. 4), a haptic motor (e.g., the haptic module 179 in FIG. 1 or the haptic motor 479 in FIG. 4), a speaker (e.g., the audio output module 155 in FIG. 1 or the speaker 455 in FIG. 4), haptic motor driving circuitry, audio circuitry, at least one processor, comprising processing circuitry (e.g., the processor 120 in FIG. 1 or the processor 420 in FIG. 4), and memory (e.g., the memory 130 in FIG. 1 or the memory 430 in FIG. 4) storing instructions. At least one processor, individually and/or collectively, may be configured to execute the instructions and cause the electronic device to: output, through the speaker, audio signals corresponding to audio data using the audio circuitry; identify, based on haptic signals being output concurrently with the output of the audio signals through the speaker, the audio signals to be output and the haptic signals to be output; estimate a discharge current value of the battery associated with the audio signals to be output concurrently with output of the haptic signals; adjust, based on the estimated discharge current value exceeding a specified discharge current value, a volume associated with the audio signals to be output and/or a driving voltage for driving the haptic motor in association with the haptic signals to be output such that the discharge current value of the battery due to the output of the audio signals and haptic signals does not exceed the specified discharge current value.

According to an example embodiment at least one processor, individually and/or collectively, may be configured to cause the electronic device to identify, based on the estimated discharge current value exceeding the specified discharge current value, whether to adjust the volume, the driving voltage, or the volume and the driving voltage.

According to an example embodiment at least one processor, individually and/or collectively, may be configured to cause the electronic device to adjust the volume using a specified volume control ratio.

According to an example embodiment at least one processor, individually and/or collectively, may be configured to cause the electronic device to obtain the specified volume control ratio by dividing a value, obtained by subtracting the maximum peak current value of a current to be provided to the haptic motor from the specified discharge current value, by the maximum peak current value of a current to be provided to the speaker.

According to an example embodiment at least one processor, individually and/or collectively, may be configured to cause the electronic device to adjust the volume using an inverted value of a current value to be provided to the haptic motor.

According to an example embodiment at least one processor, individually and/or collectively, may be configured to cause the electronic device to adjust the volume using a specified volume limit value based on a current value to be provided to the haptic motor.

According to an example embodiment at least one processor, individually and/or collectively, may be configured to cause the electronic device to adjust the driving voltage using a specified haptic motor driving voltage ratio.

According to an example embodiment at least one processor, individually and/or collectively, may be configured to cause the electronic device to adjust the driving voltage using a specified haptic motor driving voltage limit value.

According to an example embodiment at least one processor, individually and/or collectively, may be configured to cause the electronic device to adjust the driving voltage using an inverted volume of the volume associated with the audio signals to be output through the speaker.

According to an example embodiment at least one processor, individually and/or collectively, may be configured to cause the electronic device to lower the specified discharge current value by a specified value, based on a specified condition.

Figure 5:
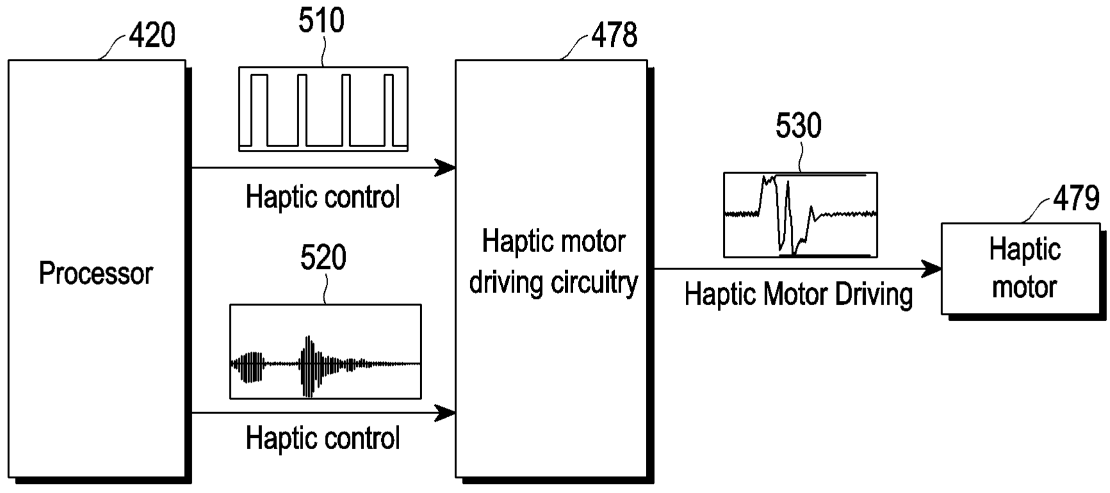
FIG. 5 is a diagram illustrating an example haptic motor driving operation according to various embodiments.

FIG. 5 is a diagram illustrating an example haptic motor driving operation according to various embodiments.

Referring to FIG. 5, the processor 420 according to an embodiment, based on a haptic motor driving (or haptic control) event, may transmit a first haptic control signal 510 or a second haptic control signal 520 to the haptic motor driving circuitry 478. The processor 420 according to an embodiment may transmit the first haptic control signal 510 based on waveform data to the haptic motor driving circuitry 478 through inter-integrated circuit (I2C) communication or serial peripheral interface (SPI) communication, or may transmit the second haptic control signal 520 based on audio data to the haptic motor driving circuitry 478 through inter-integrated circuit (IC) sound (I2S) communication or time division multiplexing (TDM) communication. The haptic motor driving circuitry 478 according to an embodiment may receive the first haptic control signal 510 or the second haptic control signal 520. The haptic motor driving circuitry 478 according to an embodiment may boost and output a haptic motor driving voltage 530 according to the signal waveform of the input first haptic control signal 510 or second haptic control signal 520. The haptic motor 479 according to an embodiment may vibrate or perform a haptic operation according to the boosted haptic motor driving voltage.

Figure 6:
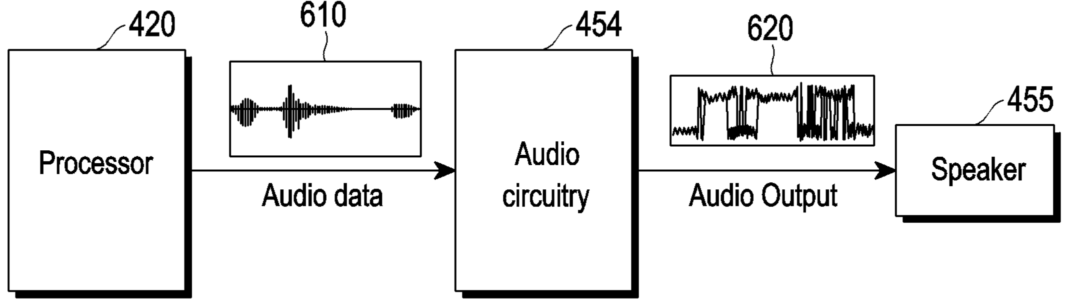
FIG. 6 is a diagram illustrating an example audio data output operation according to various embodiments.

FIG. 6 is a diagram illustrating an example audio data output operation according to various embodiments.

Referring to FIG. 6, the processor 420 according to an embodiment, based on an audio output event, may transmit an audio data signal 610 corresponding to a sound source to be output to audio circuitry 454 through inter-integrated circuit (IC) sound (I2S) communication or time division multiplexing (TDM) communication. The audio circuitry 454 according to an embodiment, based on the volume of the audio data signal 610, may apply a voltage (audio output) 620 corresponding to an audio signal to the speaker 455. The speaker 455 according to an embodiment may output the audio signal according to a voltage (audio output) 620 corresponding to the audio signal.

Referring to FIGS. 5 and 6, the processor 420 according to an embodiment may identify audio signals to be output and haptic signals to be output, based on identification of a state in which a haptic motor driving operation and an audio output operation are performed (or are to be performed together). The processor 420 according to an embodiment may estimate the discharge current value of the battery associated with the audio signals to be output concurrently with the output of the haptic signals.

When the estimated discharge current value exceeds a predefined discharge current value, the processor 420 according to an embodiment may adjust the voltage of the haptic control signal 510 or the second haptic control signal 520, adjust the audio data signal 610 (or the volume of the audio data signal 610), or adjust the audio data signal 610 (or the volume of the audio data signal 610) while adjusting the voltage of the first haptic control signal 510 or the second haptic control signal 520 such that the discharge current value of battery due to the output of the audio signals and the haptic signals does not exceed the predefined discharge current value.

Figure 7:
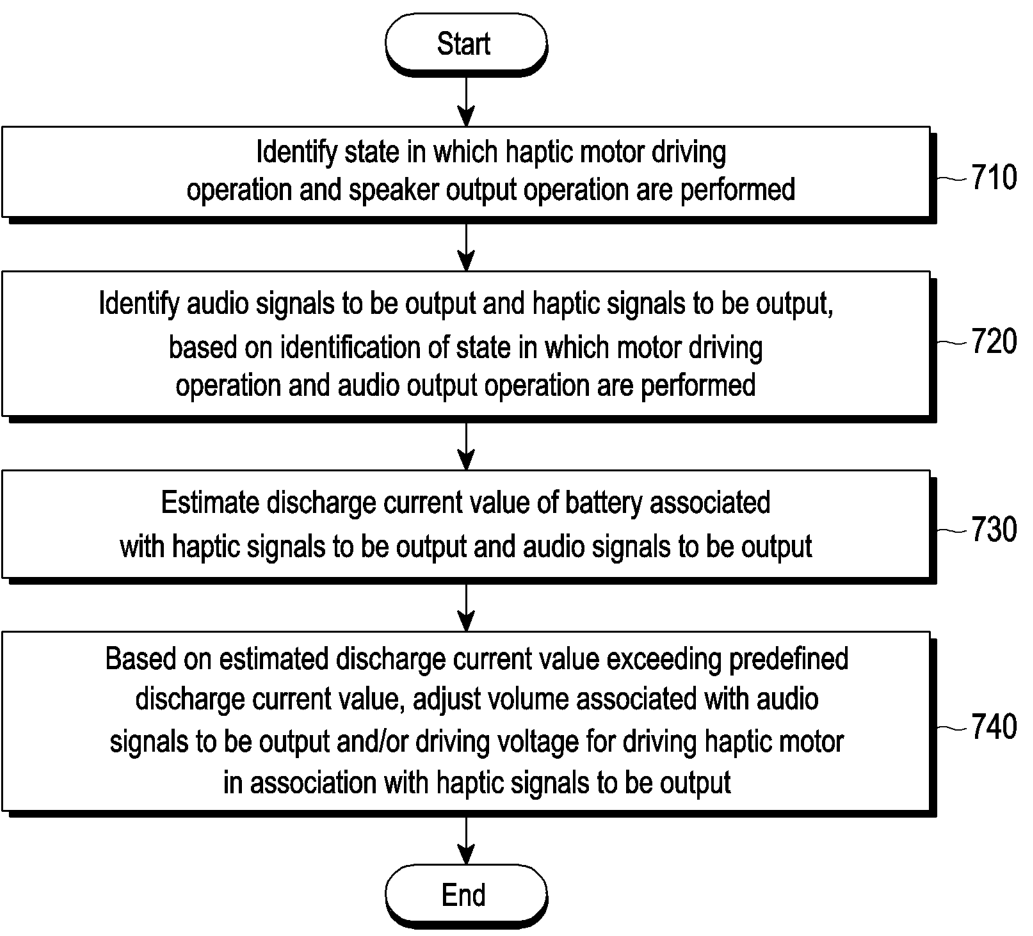
FIG. 7 is a flowchart illustrating example audio output and haptic motor control operations in an electronic device according to various embodiments.

FIG. 7 is a flowchart illustrating example audio output and haptic motor control operations in an electronic device according to various embodiments.

Referring to FIG. 7, a processor (e.g., the processor 120 in FIG. 1 or the processor 420 in FIG. 4) of an electronic device (e.g., the electronic device 101 in FIG. 1, the electronic device 200 in FIGS. 2A and 2B, the electronic device 300 in FIG. 3, or the electronic device 401 in FIG. 4) according to an embodiment may perform at least one of operations 710 to 740.

In operation 710, the processor 420 according to an embodiment may identify a state in which a haptic motor driving operation and an audio output operation are performed. The processor 420 according to an embodiment may identify a state in which the haptic motor driving operation and the audio output operation are performed simultaneously (or together) (or a state in which the haptic motor driving operation and the audio output operation are to be performed simultaneously or together). The haptic motor driving operation according to an embodiment may be an operation of driving the haptic motor 479 by providing a haptic motor driving control signal to the haptic motor driving circuitry 478. The audio output operation according to an embodiment may be an operation of providing audio data to the audio circuitry 454 to convert the same into an analog audio signal, and outputting the converted audio signal through the speaker 420.

In operation 720, the processor 420 according to an embodiment may identify audio signals to be output and haptic signals to be output, based on identification of the state in which the haptic motor driving operation and the audio output operation are performed. The processor 420 according to an embodiment may output audio signals corresponding to the audio data through the speaker 455 using the audio circuitry 454 and, when haptic signals are (or are to be) output simultaneously with the output of the audio signals through the speaker 455, identify audio signals to be output and haptic signals to be output.

In operation 730, the processor 420 according to an embodiment may estimate a discharge current value of the battery associated with the haptic signals to be output and the audio signals to be output. The processor 420 according to an embodiment may estimate a discharge current value of the battery associated with the audio signals to be output concurrently with the output of the haptic signals. The discharge current value of the battery 489 according to an embodiment may be the discharge current value to be discharged (or provided) from the battery 489 when the processor 420 performs the haptic motor driving operation and the audio output operation together (or simultaneously). The processor 420 according to an embodiment may estimate a first battery discharge current value when performing an audio output operation using first estimated battery discharge current value information depending on the volume (e.g., dB) when outputting the audio signals through the speaker 455. The processor 420 according to an embodiment may estimate a second battery discharge current value when performing the haptic motor driving operation using second estimated battery discharge current value information depending on the haptic motor driving voltage when outputting haptic signals through the haptic motor 479. When performing the haptic motor driving operation and the audio output operation together (or simultaneously), the processor 420 according to an embodiment may estimate the first battery discharge current value and the second battery discharge current value, and estimate the sum of the estimated first battery discharge current value and the estimated second battery discharge current value as the discharge current value of the battery 489 when the haptic motor driving operation and the audio output operation are performed together (or simultaneously). The processor 420 according to an embodiment may identify a period of time during which the haptic motor driving operation and the audio output operation are performed simultaneously before the haptic motor driving operation and the audio output operation are performed, and estimate the discharge current value of the battery associated with the haptic signals and audio signals to be output in the period of time during which the haptic motor driving operation and the audio output operation are performed simultaneously.

In operation 740, the processor 420 according to an embodiment, based on the estimated discharge current value exceeding a predefined (e.g., specified) discharge current value, may adjust the volume associated with the audio signals to be output and/or adjust the driving voltage for driving the haptic motor 479 in association with the haptic signals to be output such that the discharge current value of the battery due to the output of the audio signals and the haptic signals does not exceed the predefined discharge current value.

A method of controlling audio output and a haptic motor in an electronic device (e.g., the electronic device 101 in FIG. 1, the electronic device 200 in FIGS. 2A and 2B, the electronic device 300 in FIG. 3, or the electronic device 401 in FIG. 4) according to an example embodiment may include: outputting, through a speaker (e.g., the audio output module 155 in FIG. 1 or the speaker 455 in FIG. 4), audio signals corresponding to audio data using audio circuitry; identifying, based on haptic signals being output concurrently with the output of the audio signals through the speaker, the audio signals to be output and the haptic signals to be output; estimating a discharge current value of a battery associated with the audio signals to be output concurrently with the output of the haptic signals to be output; based on the estimated discharge current value exceeding a specified discharge current value, adjusting volume associated with the audio signals to be output and/or a driving voltage for driving the haptic motor (e.g., the haptic module 179 in FIG. 1 or the haptic motor 479 in FIG. 4) in association with the haptic signals to be output such that the discharge current value of the battery due to the output of the audio signals and haptic signals does not exceed the specified discharge current value.

The method according to an example embodiment may further include, based on the estimated discharge current value exceeding the specified discharge current value, selecting whether to adjust the volume, the driving voltage, or the volume and the driving voltage.

The method according to an example embodiment may further include adjusting the volume using a specified volume control ratio.

The method according to an example embodiment may further include obtaining the specified volume control ratio by dividing a value, obtained by subtracting the maximum peak current value of a current to be provided to the haptic motor from the predefined discharge current value, by the maximum peak current value of a current to be provided to the speaker.

The method according to an example embodiment may further include adjusting the volume using an inverted value of a current value to be provided to the haptic motor.

The method according to an example embodiment may further include adjusting the volume using a specified volume limit value, based on a current value to be provided to the haptic motor.

The method according to an example embodiment may further include adjusting the driving voltage using a specified haptic motor driving voltage ratio.

The method according to an example embodiment may further include adjusting the driving voltage using a specified haptic motor driving voltage limit value.

The method according to an example embodiment may further include adjusting the driving voltage using an inverted volume of the volume associated with the audio signals to be output.

Figure 8A:
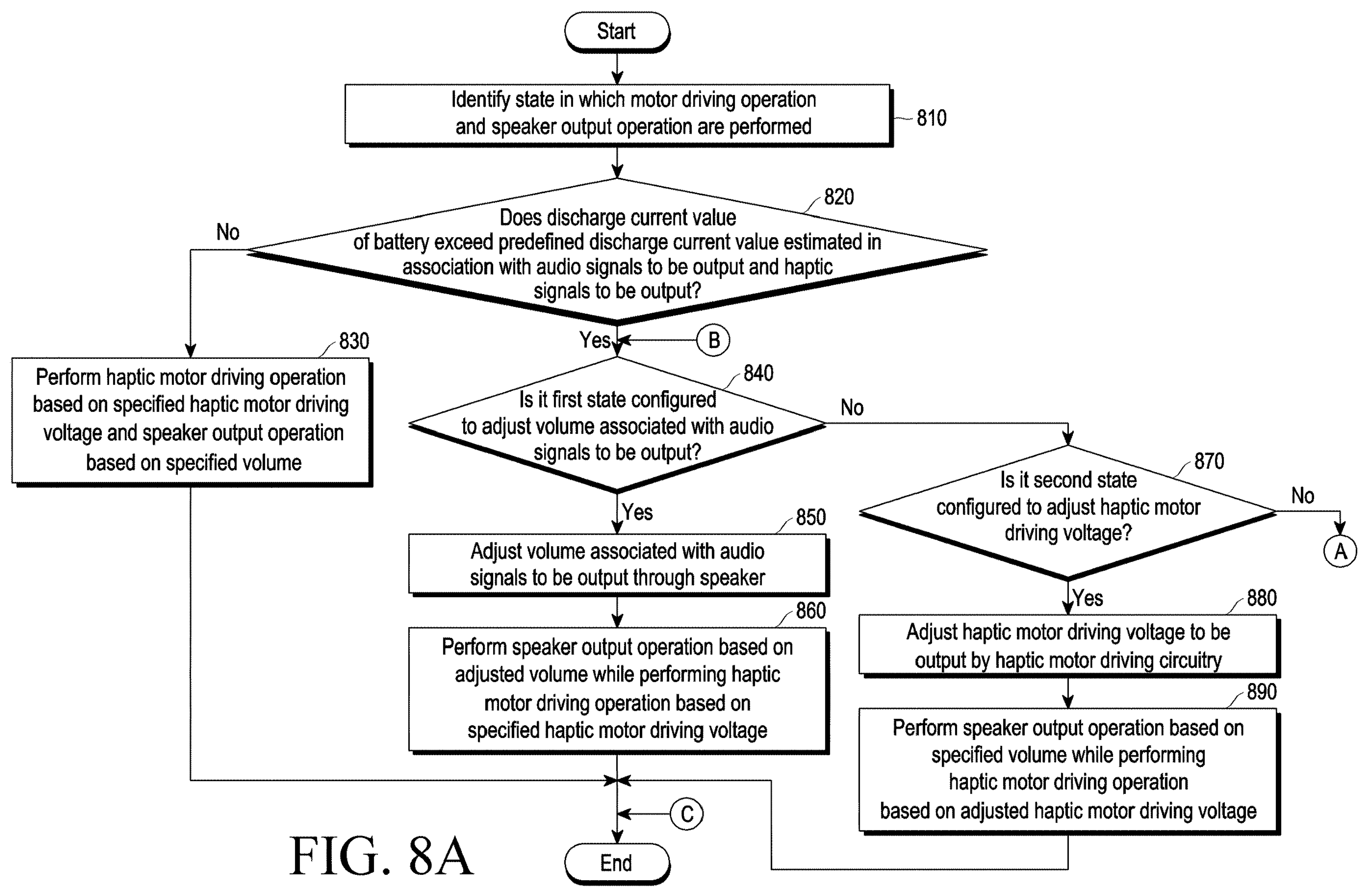
FIG. 8A is a flowchart illustrating an example operation of controlling haptic motor driving and audio output depending on whether the electronic device is in a first state configured to adjust the volume of audio signals or a second state configured to adjust haptic motor driving voltage according to various embodiments.

FIG. 8A is a flowchart illustrating an example operation of controlling haptic motor driving and audio output depending on whether the electronic device is in a first state configured to adjust the volume of audio signals or a second state configured to adjust the driving voltage associated with haptic signals according to various embodiments.

Referring to FIG. 8A, a processor (e.g., the processor 120 in FIG. 1 or the processor 420 in FIG. 4) of an electronic device (e.g., the electronic device 101 in FIG. 1, the electronic device 200 in FIGS. 2A and 2B, the electronic device 300 in FIG. 3, or the electronic device 401 in FIG. 4) according to an embodiment may perform at least one of operations 810 to 890.

In operation 810, the processor 420 according to an embodiment may identify a state in which the haptic motor driving operation and the audio output operation are performed (or are to be performed) simultaneously (or together). The haptic motor driving operation according to an embodiment may be an operation of driving the haptic motor 479 by providing a haptic motor driving control signal to the haptic motor driving circuitry 478. The audio output operation according to an embodiment may be an operation of providing audio data to the audio circuitry 454 so that the audio circuitry 454 provides audio output voltages corresponding to the audio data to the speaker 455, thereby outputting audio signals through the speaker 455. The processor 420 according to an embodiment may output audio signals corresponding to audio data through the speaker 455 using the audio circuitry 454, when haptic signals are (or are to be) output simultaneously with the output of the audio signals through the speaker 455, identify the state in which the haptic motor driving operation and the speaker output operation are (or are to be) performed together (or simultaneously), and identify the audio signals to be output and the haptic signals to be output.

In operation 820, the processor 420 according to an embodiment may identify whether a discharge current value of the battery 489, which is estimated in relation to the audio signals to be output and the haptic signals to be output according to the execution of the haptic motor driving operation and the audio output operation, exceeds a predefined discharge current value. The processor 420 according to an embodiment may estimate a first battery discharge current value associated with the audio signals to be output using prestored first estimated battery discharge current value information depending on the volume (e.g., dB) when outputting audio signals through the speaker 455. The processor 420 according to an embodiment may estimate a second battery discharge current value associated with the haptic signals to be output using prestored second estimated battery discharge current value information depending on in the haptic motor driving voltage. The processor 420 according to an embodiment may estimate the first battery discharge current value and the second battery discharge current value in association with the audio signals to be output and the haptic signals to be output according to the execution of the haptic motor driving operation and the haptic audio output operation, and estimate the sum of the estimated first battery discharge current value and the estimated second battery discharge current value as the discharge current value of the battery 489 when the haptic motor driving operation and the audio output operation are performed together (or simultaneously). The processor 420 according to an embodiment may identify whether the estimated discharge current value exceeds a predefined discharge current value.

In operation 830, the processor 420 according to an embodiment, based on the estimated discharge current value of the battery 489, which is estimated according to the execution of the haptic motor driving operation and the audio output operation, not exceeding the predefined discharge current value, may perform the haptic motor driving operation, based on a specified haptic motor driving voltage, and the speaker output operation, based on specified volume.

In operation 840, the processor 420 according to an embodiment, based on the estimated discharge current value of the battery 489 exceeding the predefined discharge current value, may determine whether a first state configured to adjust the volume associated with the audio signals to be output is identified. The first state configured to adjust the volume associated with the audio signals to be output according to an embodiment may include a state in which the haptic motor 479 performs a vibrating operation (or haptic operation) of maximum intensity (or a state of performing a vibrating operation or haptic operation using power exceeding specified power). According to an embodiment, the processor 420 may perform a vibrating operation (or haptic operation) of maximum intensity (or perform a vibrating operation or haptic operation using power exceeding the specified power) when performing a specified first notification. According to an embodiment, the specified first notification may include a notification that the user is necessarily required to recognize (via vibration or haptics). According to an embodiment, the specified first notification may be specified when manufacturing the electronic device 401 or may be configured (or designated) by the user (user input or user selection). According to an embodiment, the specified first notification may include notifications related to diving while the user is diving (e.g., diving time, hypothermia, diving depth, or other notifications related to diving), notifications related to noise exposure (e.g., noise level, duration of noise exposure, potential hearing loss based on duration of noise exposure, or other notifications associated with noise exposure) while the user is exposed to a noisy environment for a long period of time, notifications related to disasters (e.g., earthquakes, wildfires, typhoons, tsunamis, heavy rain, heavy snow, or other notifications related to disasters), or notifications configured by the user to output the maximum vibration or haptics (e.g., important text or important notifications).

In operation 850, when the first state configured to adjust the volume associated with the audio signals to be output is identified, the processor 420 according to an embodiment may adjust the volume associated with the audio signals to be output through the speaker 455. When the first state configured to adjust the volume associated with the audio signals to be output is identified, the processor 420 according to an embodiment may adjust the volume associated with the audio signals to be output using a specified volume control ratio, adjust the volume associated with the audio signals to be output using the inverted value of a current value to be provided to the haptic motor 479, or adjust the volume associated with the audio signals to be output using a specified volume limit value based on a current value to be provided to the haptic motor 479.

In operation 860, the processor 420 according to an embodiment may perform the audio output operation through the speaker 455, based on the adjusted volume, while performing the haptic motor driving operation, based on a specified haptic motor driving voltage.

In operation 870, when the first state configured to adjust the volume associated with the audio signals to be output, in the state where the estimated discharge current value of the battery 489 exceeds the predefined discharge current value, is not identified, the processor 420 according to an embodiment may determine whether a second state configured to adjust the haptic motor driving voltage is identified. The second state configured to adjust the haptic motor driving voltage according to an embodiment may include a state in which the electronic device 401 performs an audio output operation at the maximum level (or volume) (or a state of performing an audio output operation using power exceeding specified power). According to an embodiment, the processor 420 may perform an audio output operation at the maximum level (or volume) (or perform an audio output operation using power exceeding the specified power) when performing a specified second notification. According to an embodiment, the specified second notification may include notifications that other people, as well as the user, are necessarily required to recognize (via audio output). According to an embodiment, the specified second notification may include notifications related to the user's emergency situation (e.g., trip, fall, collision, or other emergency situations), self-defense notifications (e.g., a siren in an emergency situation threatened by a suspicious person), notifications related to finding an electronic device, or other notifications configured by the user to maximize and/or increase audio output.

In operation 880, the processor 420 according to an embodiment, based on the second state configured to adjust the haptic motor driving voltage, may adjust the driving voltage to be output by the haptic motor driving circuitry 478. When the second state configured to adjust the haptic motor driving voltage is identified, the processor 420 according to an embodiment may adjust the driving voltage using a specified haptic motor driving voltage ratio, adjust the driving voltage using a specified haptic motor driving voltage limit value, or adjust the driving voltage using the inverted volume of the volume associated with the audio signals to be output through the speaker 455.

In operation 890, the processor 420 according to an embodiment may perform the audio output operation through the speaker 455, based on a specified volume, while performing the haptic motor driving operation, based on the adjusted driving voltage.

Figure 8B:
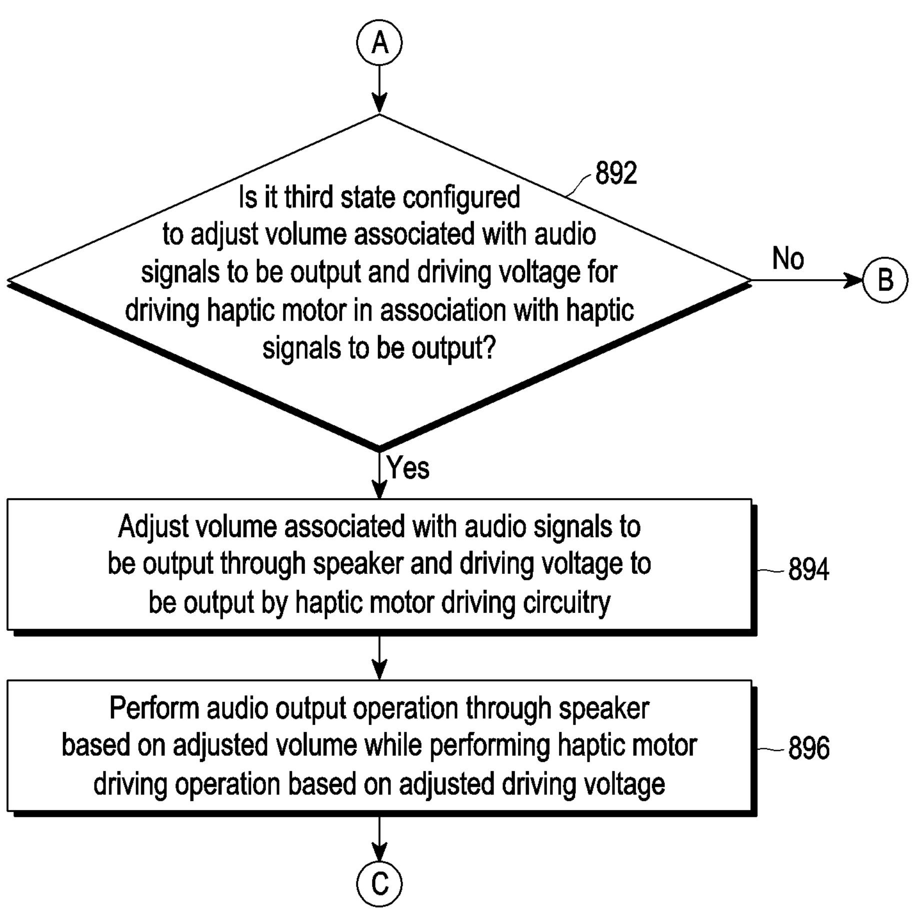
FIG. 8B is a flowchart illustrating an example operation of controlling haptic motor driving and audio output according to a third state configured to adjust the volume of audio signals and the haptic motor driving voltage in an electronic device according to various embodiments.

When the first state and the second state are not satisfied, the processor 420 according to an embodiment may proceed to operation 892 in FIG. 8B.

FIG. 8B is a flowchart illustrating an example operation of controlling haptic motor driving and audio output according to a third state configured to adjust the volume associated with audio signals to be output and the driving voltage for driving the haptic motor 479 in association with haptic signals to be output in an electronic device 401 according to various embodiments.

Referring to FIG. 8B, in operation 892, the processor 420 according to an embodiment may determine whether a third state configured to adjust the volume associated with the audio signals to be output and the driving voltage for driving the haptic motor 479 is identified. When the third state is not identified, the processor 420 according to an embodiment may return to the operation prior to operation 840 in FIG. 8A.

In operation 894, the processor 420 according to an embodiment, based on the third state configured to adjust the volume associated with the audio signals to be output and the driving voltage for driving the haptic motor 479, may adjust the volume associated with the audio signals to be output and adjust the driving voltage to be output by the haptic motor driving circuitry 478. When the third state configured to adjust the volume associated with the audio signals to be output and the driving voltage for driving the haptic motor 479 in association with the haptic signals to be output is identified, the processor 420 according to an embodiment may obtain a ratio (B/A) of a pre-specified discharge current value (B) (e.g., the maximum allowable discharge current value of battery) to a discharge current value (A) estimated during the haptic motor driving operation and the audio output operation (e.g., the sum of the estimated current value to be provided to the speaker 455 and the estimated current value to be provided to the haptic motor 479), adjust the driving voltage by multiplying the ratio (B/A) by the driving voltage to drive the haptic motor 479, and adjust the volume by multiplying the ratio (B/A) by the volume associated with the audio signals to be output.

In operation 896, the processor 420 according to an embodiment may perform the audio output operation through the speaker 455, based on the adjusted volume, while performing the haptic motor driving operation, based on the adjusted driving voltage.

Figure 9:
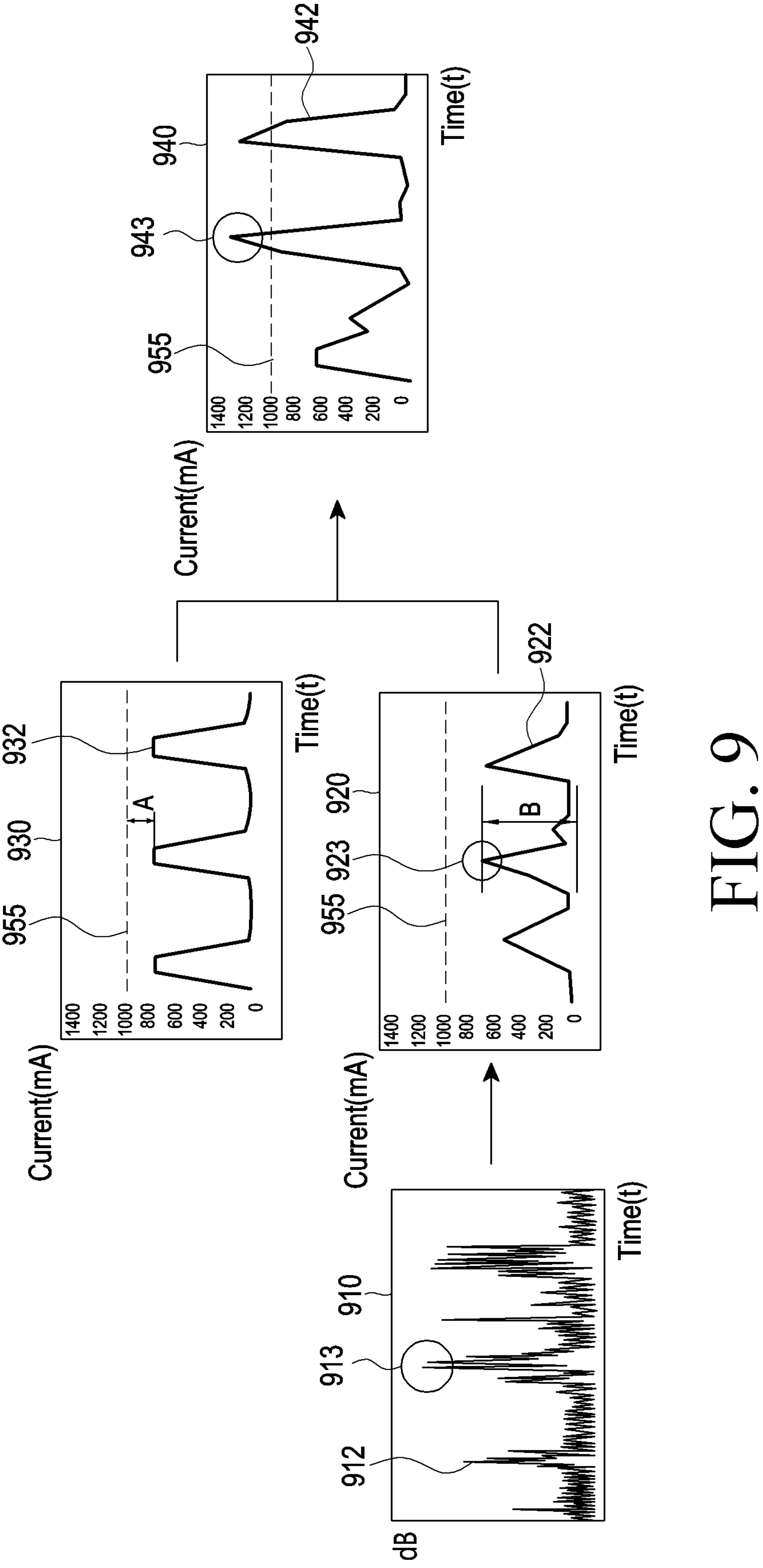
FIG. 9 is a diagram illustrating an example where the discharge current value of a battery exceeds a predefined discharge current value as a result of performing a haptic motor driving operation and an audio output operation according to various embodiments.

FIG. 9 is a diagram illustrating an example where the discharge current value of a battery exceeds a pre-specified discharge current value as a result of performing a haptic motor driving operation and an audio output operation according to various embodiments.

Referring to FIG. 9, the first graph 910 according to an embodiment may be a graph representing audio data, in which the horizontal axis may represent time (t) and the vertical axis may represent the volume (dB) associated with audio signals 912 to be output through the speaker 455.

The second graph 920 according to an embodiment may be a graph showing the discharge current 922 that is discharged (or consumed) when the audio data 912 is output through the speaker 455, and the horizontal axis is time (t), in which the horizontal axis may represent time (t) and the vertical axis may represent the value of discharge current (mA) consumed (or discharged) when audio data is output through the speaker 455. In the state where the haptic motor 479 is not driven, even when audio signals are output at the maximum peak volume 913 through the speaker 455, the maximum peak current value 923 of the discharge current 922 consumed (or discharged) may not exceed a predefined current value 955 (e.g., the maximum allowable discharge current value).

The third graph 930 according to an embodiment may be a graph showing the discharge current 932 that is discharged (or consumed) when the haptic motor 479 is driven, in which the horizontal axis may represent time (t) and the vertical axis may represent the value of the discharge current (mA) that is discharged (or consumed) when the haptic motor 479 is driven. In the state where audio signals are not output, even when the haptic motor 479 is driven at the maximum vibration, the maximum peak current value of the discharge current discharged (or consumed) may not exceed a predefined current value 955 (e.g., the maximum allowable discharge current value).

The fourth graph 940 according to an embodiment may be a graph showing the discharge current 942 that is discharged (or consumed) when the haptic motor 479 is driven while audio signals are output through the speaker 455, in which the horizontal axis may represent time (t) and the vertical axis may represent the value of the discharge current (mA) that is discharged (or consumed) when the haptic motor 479 is driven while audio signals are output through the speaker 455.

According to an embodiment, when the haptic motor 479 is driven while audio signals are output through the speaker 455, the discharge current 942 that is discharged (or consumed) may exceed a predefined current value of the battery 489 (e.g., the maximum allowable discharge current value) 955 (e.g., 943).

In the case where the haptic motor 479 is driven while audio signals are output through the speaker 455, the processor 420 according to an embodiment may adjust the volume associated with the audio signals to be output through the speaker 455 or adjust the driving voltage of the haptic motor driving circuitry 478 such that the value of the discharge current 942 that is discharged (or consumed) does not exceed a pre-specified current value (e.g., the maximum allowable discharge current value) 955 of the battery 489.

Figure 10:
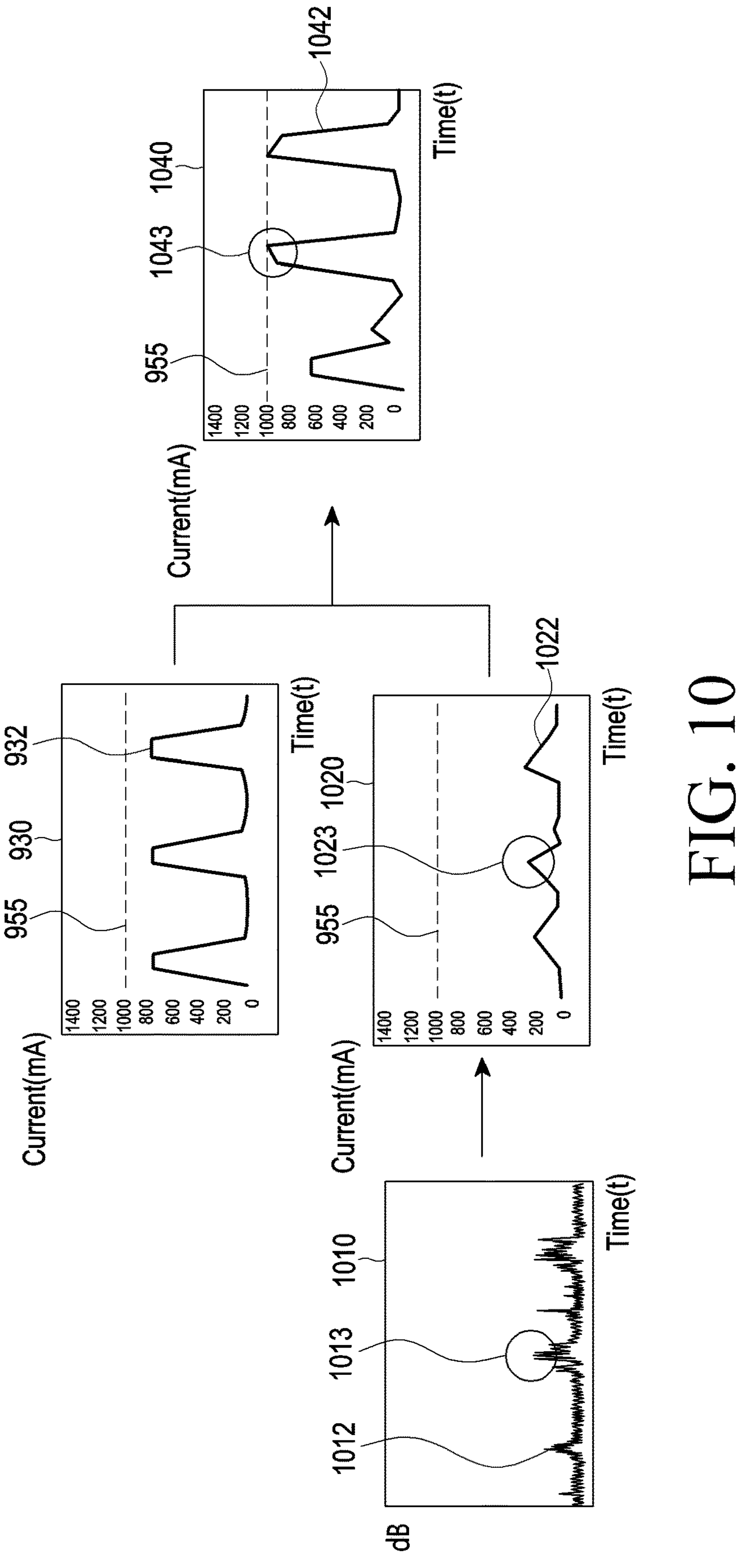
FIG. 10 is a diagram illustrating an example where the volume of audio signals is adjusted using a specified volume control ratio such that the discharge current value of a battery does not exceed a predefined discharge current value as a result of performing a haptic motor driving operation and an audio output operation according to various embodiments.

FIG. 10 is a diagram illustrating an example of adjusting the volume associated with audio signals to be output using a specified volume control ratio such that the discharge current value of the battery does not exceed a predefined discharge current value as a result of performing a haptic motor driving operation and an audio output operation according to various embodiments.

Referring to FIGS. 9 and 10, the processor 420 according to an embodiment may obtain a specified volume control ratio (dB scaling) (A/B) by dividing the value (A), which is obtained by subtracting the maximum peak current value of the current to be provided to the haptic motor 479) (e.g., the discharge current 932 that is discharged (or consumed) when the haptic motor 479 is driven) from the predefined current value (e.g., the maximum allowable discharge current value) 955 of the battery 489, by the maximum peak current value (B) of the current to be provided to the speaker 455 (e.g., the discharge current 922 discharged (or consumed) when audio signals 912 are output through the speaker 455).

Referring to FIG. 10, the processor 420 according to an embodiment may obtain audio signals 1012 adjusted (e.g., lowered) in its volume according to the obtained volume control ratio (A/B), as shown in the fifth graph 1010. As the volume is adjusted, the maximum peak volume 1013 of the audio signals may also be lowered.

The sixth graph 1020 according to an embodiment may be a graph showing the discharge current 1022 that is discharged (or consumed) when the audio signals 1012 are output at the adjusted volume through the speaker 455, in which the horizontal axis may represent time (t) and the vertical axis may represent the value of discharge current (mA) consumed (or discharged) when the audio signals are output at the adjusted volume through the speaker 455. As the maximum peak volume 1013 of the audio signals is lowered, the maximum peak current value 1023 of the discharge current (mA) may also be lowered when audio signals are output at the adjusted volume through the speaker 455.

The seventh graph 1040 according to an embodiment may be a graph showing the discharge current 1042 that is discharged (or consumed) when the haptic motor 479 is driven while the audio signals are output at the adjusted volume through the speaker 455, in which the horizontal axis may represent time (t) and the vertical axis may represent the value of the discharge current (mA) that is discharged (or consumed) when the haptic motor 479 is driven while the audio signals are output at the adjusted volume through the speaker 455.

Referring to the seventh graph 1040 according to an embodiment, the processor 420 may adjust the volume of audio signals using a specified volume control ratio (A/B) and drive the haptic motor 479 while outputting the signals at the adjusted volume through the speaker 455, so that the value of the discharge current 1042 discharged (or consumed) does not exceed the predefined discharge current value (e.g., the maximum allowable discharge current value) 955 of the battery 489 (e.g., 1043).

Figure 11:
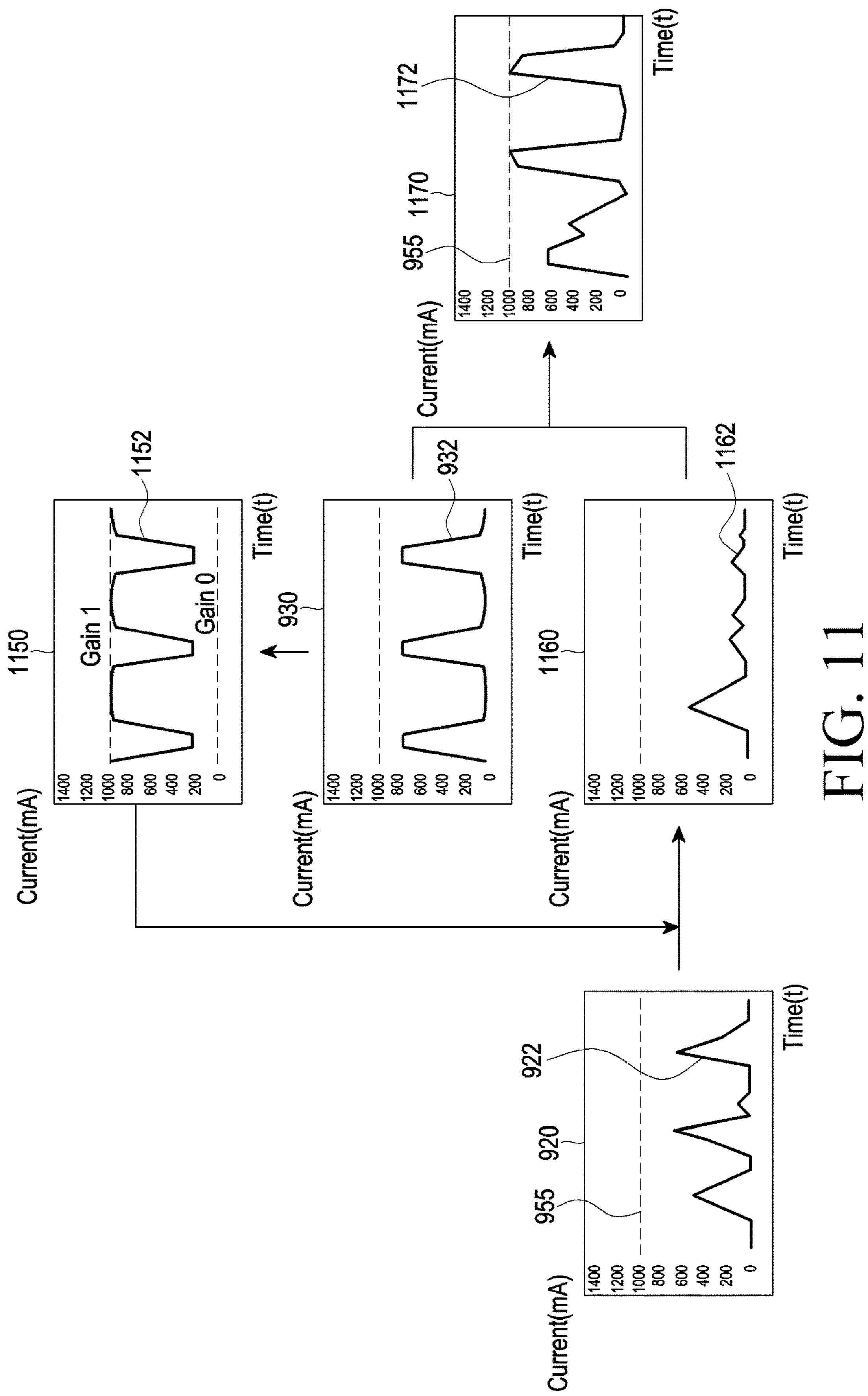
FIG. 11 is a diagram illustrating an example where the volume of audio signals is adjusted using the inverted value of a current value to be provided to a haptic motor when performing a haptic motor driving operation and an audio output operation according to various embodiments.

FIG. 11 is a diagram illustrating an example where the volume associated with audio signals is adjusted using the inverted value of a current value to be provided to a haptic motor when performing a haptic motor driving operation and an audio output operation according to various embodiments.

Referring to FIG. 11, the processor 420 according to an embodiment may obtain the inverted value 1152 of a value of the discharge current 932 that is discharged (or consumed) when the haptic motor 479 is driven. The eighth graph 1150 according to an embodiment may be a graph showing the inverted value 1152 of the discharge current 932 that is discharged (or consumed) when the haptic motor 479 is driven.

The processor 420 according to an embodiment may perform control to adjust the gain of the current to be provided to the speaker 455 (e.g., the discharge current 922 that is discharged (or consumed) when the audio signals 912 are output through the speaker 455) using the inverted value 1152 of the discharge current 932 that is discharged (or consumed) when the haptic motor 479 is driven.

The ninth graph 1160 according to an embodiment may show the discharge current 1162 adjusted in its gain from the current to be provided to the speaker 455 (the discharge current 922 that is discharged (or consumed) when the audio signals 912 are output through the speaker 455).

Referring to the tenth graph 1170 according to an embodiment, the processor 420 may adjust the gain (or volume) of the current to be provided to the speaker 455 (e.g., the discharge current 922 that is discharged (or consumed) when the audio signals 912 are output through the speaker 455), thereby preventing and/or reducing the value of the discharge current 1172 discharged (or consumed) when the haptic motor 479 is driven by applying the current 1162 of the audio signals having the adjusted gain to the speaker 455 from exceeding a predefined discharge current value (e.g., the maximum allowable discharge current value) 955 of the battery 489.

Figure 12:
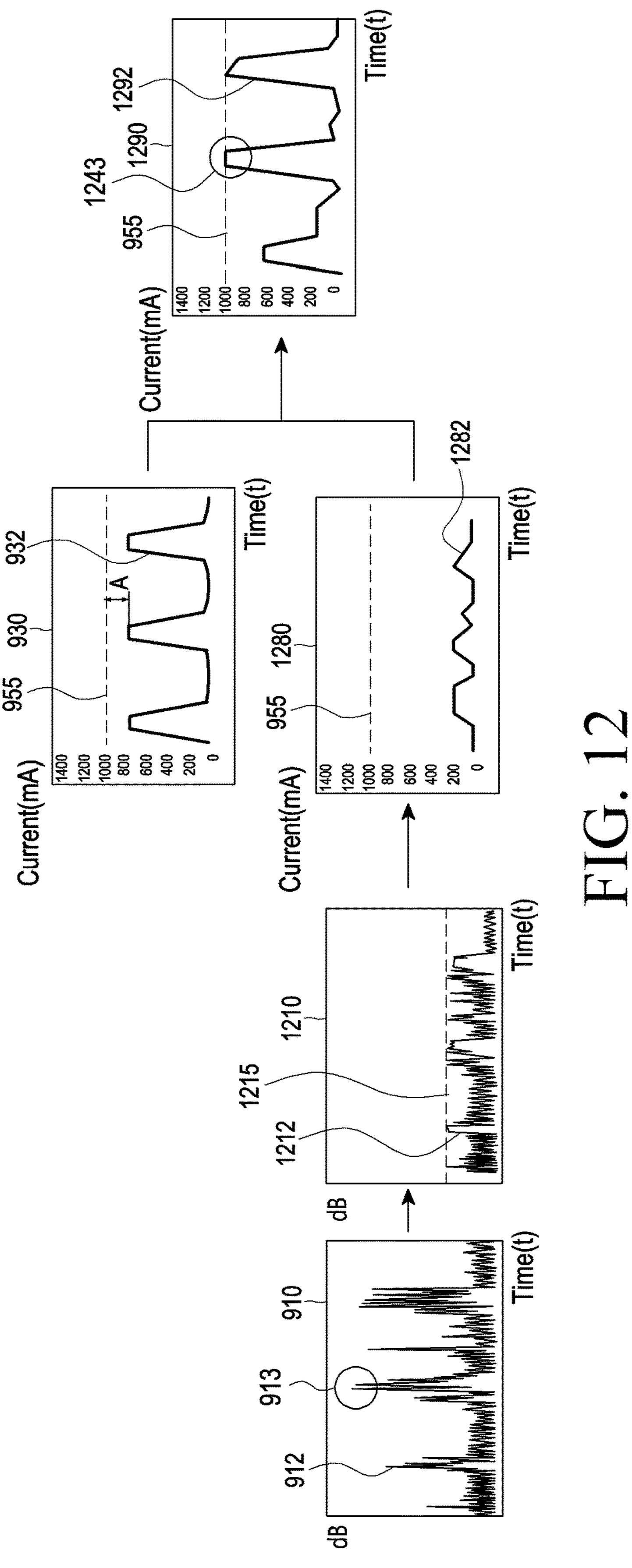
FIG. 12 is a diagram illustrating an example where the volume is adjusted using a specified volume limit value, based on the current value to be provided to a haptic motor when performing a haptic motor driving operation and an audio output operation, according to various embodiments.

FIG. 12 is a diagram illustrating an example where the volume is adjusted using a specified volume limit value, based on the current value to be provided to a haptic motor when performing a haptic motor driving operation and an audio output operation, according to various embodiments.

Referring to FIG. 12, the processor 420 according to an embodiment may obtain (or identify or calculate) a limit value of the current to be provided to the speaker 455 (e.g., the discharge current 922 that is discharged (or consumed) when the audio signals 912 are output through the speaker 455) from the value (A), which is obtained by subtracting the maximum peak current value of the current to be provided to the haptic motor 479 (e.g., the discharge current 942 that is discharged (or consumed) when the haptic motor 479 is driven) from a predefined discharge current value (e.g., the maximum allowable discharge current value of the battery 489) 955. The processor 420 according to an embodiment may obtain (or identify or calculate) the volume limit value 1215 of audio signals to be output through the speaker 455 using the limit value of the current to be provided to the speaker 455 (e.g., a discharge current 922 that is discharged (or consumed) when audio signals 912 are output through the speaker 455). The processor 420 according to an embodiment may obtain audio signals 1212 adjusted in volume according to the volume limit value 1215 as illustrated in graph 1210.

The eleventh graph 1280 according to an embodiment shows the discharge current 1282 that is discharged (or consumed) when the audio signals 1212 are output at the volume adjusted below the volume limit value 1215 through the speaker 455.

Referring to the twelfth graph 1290 according to an embodiment, the processor 420 may drive the haptic motor 479 while applying the current 1282 of the audio signals whose volume is adjusted below the volume limit value 1215 to the speaker 455 such that the value of the discharge current 1292 discharged (or consumed) does not exceed a predefined discharge current value (e.g., the maximum allowable discharge current value) 955 of the battery 489 (e.g., 1243).

Figure 13:
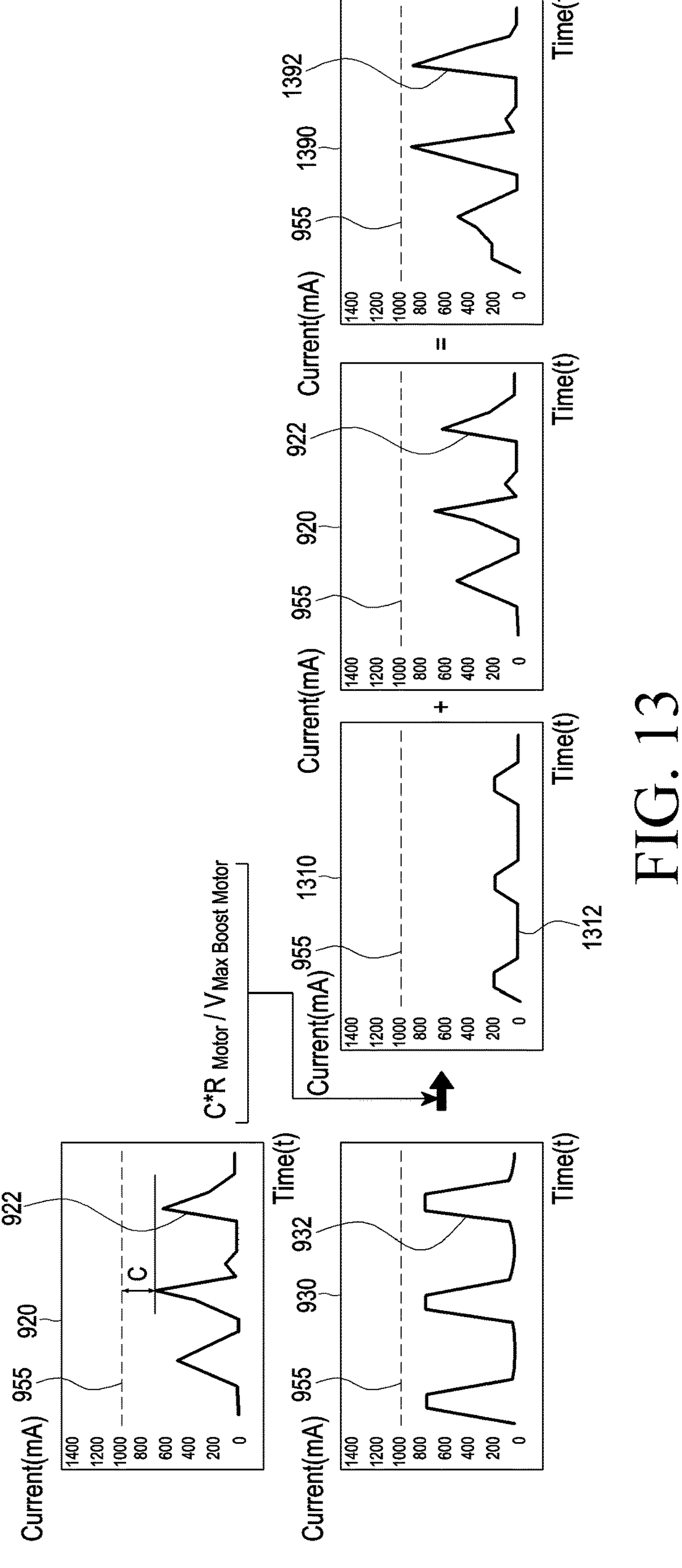
FIG. 13 is a diagram illustrating an example where the driving voltage is adjusted using a specified haptic motor driving voltage ratio when performing a haptic motor driving operation and an audio output operation according to various embodiments.

FIG. 13 is a diagram illustrating an example where the driving voltage is adjusted using a specified haptic motor driving voltage ratio when performing a haptic motor driving operation and an audio output operation according to various embodiments.

Referring to FIG. 13, the processor 420 according to an embodiment may multiply the value (C), which is obtained by subtracting the maximum peak current value of the current to be provided to the speaker 455 (e.g., the discharge current 922 that is discharged (or consumed) when the speaker 455 is driven) from the predefined discharge current value (e.g., the maximum allowable discharge current value) 955 of the battery 489, by the value (Rmotor/Vmaxboostmotor), which is obtained by dividing the resistance value (Rmotor) of the haptic motor 479 by the maximum boost voltage (Vmaxboostmotor), thereby obtaining a specified haptic motor driving voltage ratio (C*Rmotor/Vmaxboostmotor). The processor 420 according to an embodiment may control the haptic motor 479 using a haptic motor driving control signal 1312 in which the haptic motor driving voltage is adjusted to be lower according to the haptic motor driving voltage ratio, reducing the current consumption, as shown in the 13th graph 1310. The processor 420 according to an embodiment may output the audio signals through the speaker 455 while controlling the haptic motor 479 using the haptic motor driving control signal 1312 in which the haptic motor driving voltage is adjusted to be lower to reduce the current consumption, thereby preventing and/or reducing the value of the discharge current 1392, which is the sum of the value of the discharge current 1312 due to the driving of the haptic motor 479 and the discharge current 922 due to the output of the speaker 455, from exceeding a predefined discharge current value (e.g., the maximum allowable discharge current value of the battery 489) 955, as shown in the 14th graph 1390.

Figure 14:
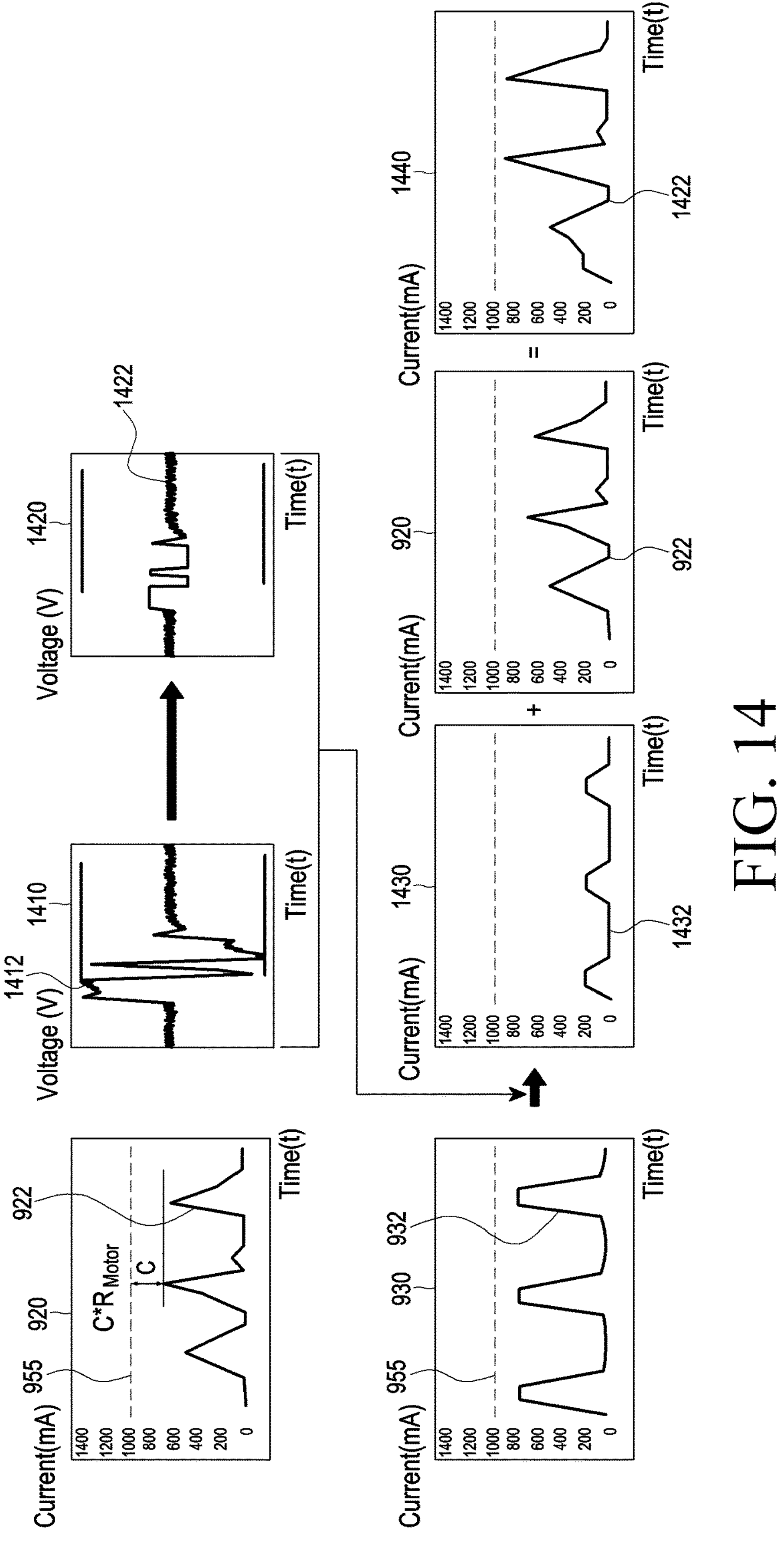
FIG. 14 is a diagram illustrating an example where the driving voltage is adjusted using a specified haptic motor driving voltage limit value when performing a haptic motor driving operation and an audio output operation according to various embodiments.

FIG. 14 is a diagram illustrating an example where the haptic motor driving voltage is adjusted using a specified haptic motor driving voltage limit value when performing a haptic motor driving operation and an audio output operation according to various embodiments.

Referring to FIG. 14, the processor 420 according to an embodiment may obtain a haptic motor driving voltage limit value (C*Rmotor) by multiplying the value (C), which is obtained by subtracting the maximum peak current value of the current to be provided to the speaker 455 (e.g., the discharge current 922 that is discharged (or consumed) when the speaker 455 is driven) from a predefined discharge current value (e.g., the maximum allowable discharge current value) 955 of the battery 489, and the resistance value (Rmotor) of the haptic motor 479.

The processor 420 according to an embodiment may clip the haptic motor driving voltage 1412 of the haptic motor driving circuitry 478 shown in the 15th graph 1410 into the haptic motor driving voltage limit value shown in the 16th graph 1420 and apply the clipped haptic motor driving voltage 1422 to the haptic motor 479, so that the current consumed (or discharged) in the motor 479 is reduced to a smaller current consumption 1432 as shown in the 17th graph 1430.

The processor 420 according to an embodiment may output audio signals through the speaker 455 while controlling the haptic motor 479 using the haptic motor driving control signal 1432, which has a reduced current consumed (or discharged) in the haptic motor 479, so that the value of the discharge current 1442, which is the sum of the value of the discharge current 1432 due to the driving of the haptic motor 479 and the discharge current 922 due to the output of the speaker 455, does not exceed a predefined discharge current value (e.g., the maximum allowable discharge current value) 955 of the battery 489 as shown in the 18th graph 1440.

Figure 15:
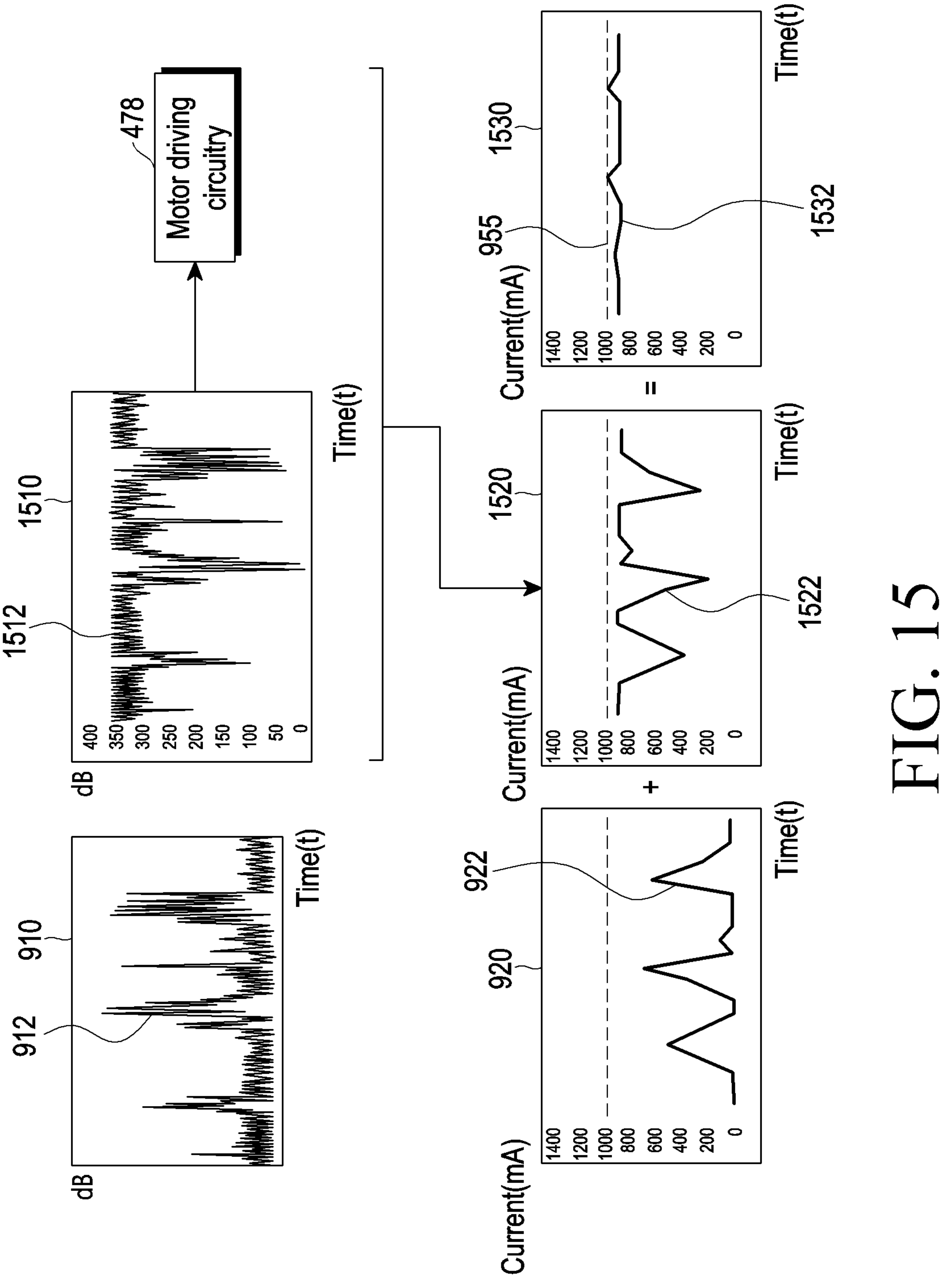
FIG. 15 is a diagram illustrating an example where the haptic motor driving voltage is adjusted using the inverted volume of the volume associated with the audio signals to be output through a speaker when performing a haptic motor driving operation and an audio output operation according to various embodiments.

FIG. 15 is a diagram illustrating an example where the haptic motor driving voltage is adjusted using the inverted volume of the volume associated with the audio signals to be output through a speaker when performing a haptic motor driving operation and an audio output operation according to various embodiments.

Referring to FIG. 15, the processor 420 according to an embodiment may obtain an inverted volume value 1512 of a volume value 912 associated with audio signals to be output through the speaker 455. The 19th graph 1510 according to an embodiment may be a graph showing the inverted volume value 1512 of the volume value 912 associated with audio signals to be output through the speaker 455.

The processor 420 according to an embodiment, based on the inverted volume value 1512 of the volume value 912 associated with the signals to be output through the speaker 455, may transmit a haptic motor driving control signal (or haptic control signal) to the haptic motor driving circuitry 478 such that the haptic motor 479 uses the current 1522 corresponding to the inverted volume value 1512 of the volume value 912 associated with the signals to be output through the speaker 455, as shown in the 20th graph 1520.

The haptic motor driving control signal according to an embodiment may be a first haptic control signal (e.g., 510 in FIG. 5) based on waveform data, which is transmitted to the haptic motor driving circuitry 478 through inter-integrated circuit (I2C) communication or serial peripheral interface (SPI) communication, or a second haptic control signal (e.g., 520 in FIG. 5) based on audio data, which is transmitted to the haptic motor driving circuitry 478 through inter-integrated circuit (IC) sound (12S) communication or time division multiplexing (TDM) communication.

The processor 420 according to an embodiment may perform control such that the current consumed (or discharged) by the haptic motor 479 while outputting audio signals through the speaker 455 becomes the inverted current of the current consumed by the speaker 455, thereby preventing and/or reducing the value of the discharge current 1532 of the battery 489 from exceeding a predefined discharge current value (e.g., the maximum allowable discharge current value of the battery 489) 955 as shown in the 21st graph 1530.

Figure 16:
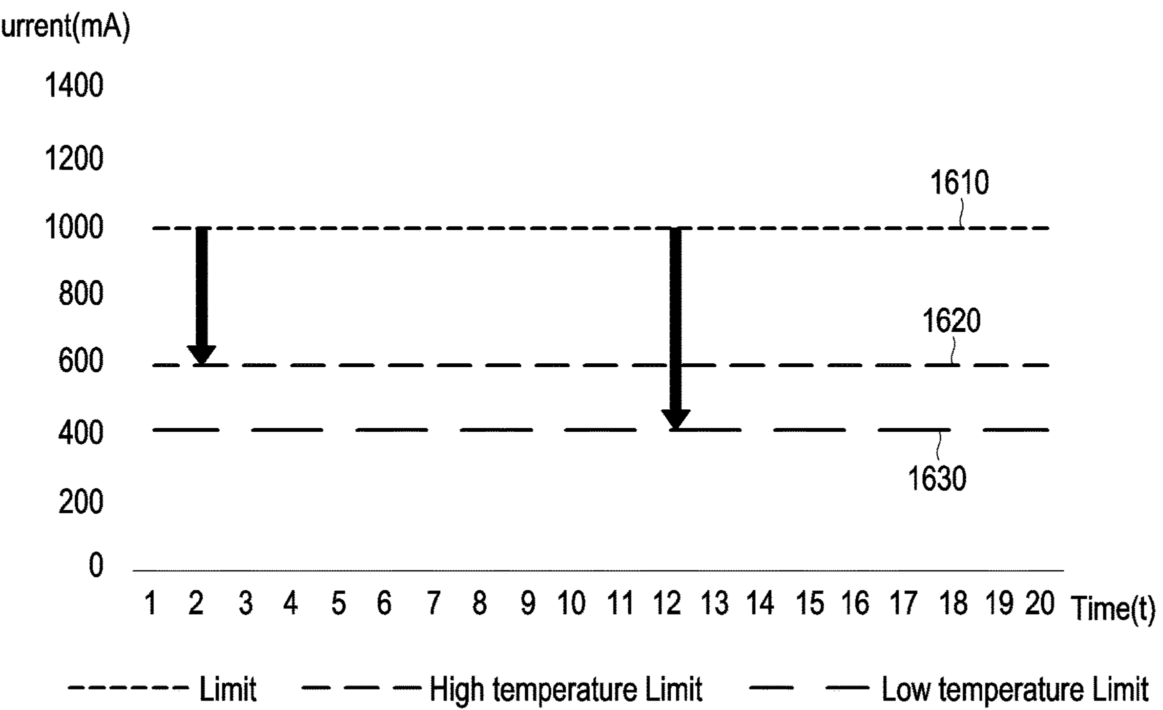
FIG. 16 is a diagram illustrating an example of adjusting a predefined discharge current value under battery performance deterioration conditions based on battery temperature according to various embodiments.

FIG. 16 is a diagram illustrating an example of adjusting a predefined discharge current value under battery performance deterioration conditions based on battery temperature according to various embodiments.

Referring to FIG. 16, the processor 420 according to an embodiment may use a predefined discharge current value (e.g., a specified maximum allowable discharge current value) 1610 in a normal mode (or the state in which battery performance deterioration conditions based on battery temperature are not satisfied). The battery performance deterioration conditions based on battery temperature according to an embodiment may include a high-temperature condition in which the temperature of the battery 489 is equal to or greater than a specified first temperature, and/or a low-temperature condition in which the temperature of the battery 489 is less than a specified second temperature. When the temperature of the battery 489 satisfies the high-temperature condition of being equal to or greater than the specified first temperature, the processor 420 according to an embodiment may change the predefined discharge current value 1610 into a first discharge current value 1620, which is lower than the predefined discharge current value 1610 by the specified first value, and use the same. When the temperature of the battery 489 satisfies the low-temperature condition of being less than the specified second temperature, the processor 420 according to an embodiment change the predefined discharge current value 1610 into a second discharge current value 1630, which is lower than the predefined discharge current value 1610 by the specified second value, and use the same.

When the predefined discharge current value 1610 is changed into the first discharge current value 1620 or the second discharge current value 1630, the processor 420 according to an embodiment may perform control such that the discharge current value of the battery 489 does not exceed the first discharge current value 1620 or the second discharge current value 1630 when performing the haptic motor driving operation and the speaker output operation together (or simultaneously). For example, when the predefined discharge current value 1610 is changed into the first discharge current value 1620 or the second discharge current value 1630, the processor 420 may adjust the volume of the audio signals and/or the haptic motor driving voltage to be lower by a ratio at which the predefined discharge current value is changed (lowered) when performing the haptic motor driving operation and the speaker output operation together (or simultaneously), thereby preventing and/or reducing the discharge current value of the battery 489 from exceeding the first discharge current value 1620 or the second discharge current value 1630 when performing the haptic motor driving operation and the speaker output operation together (or simultaneously).

Figure 17:
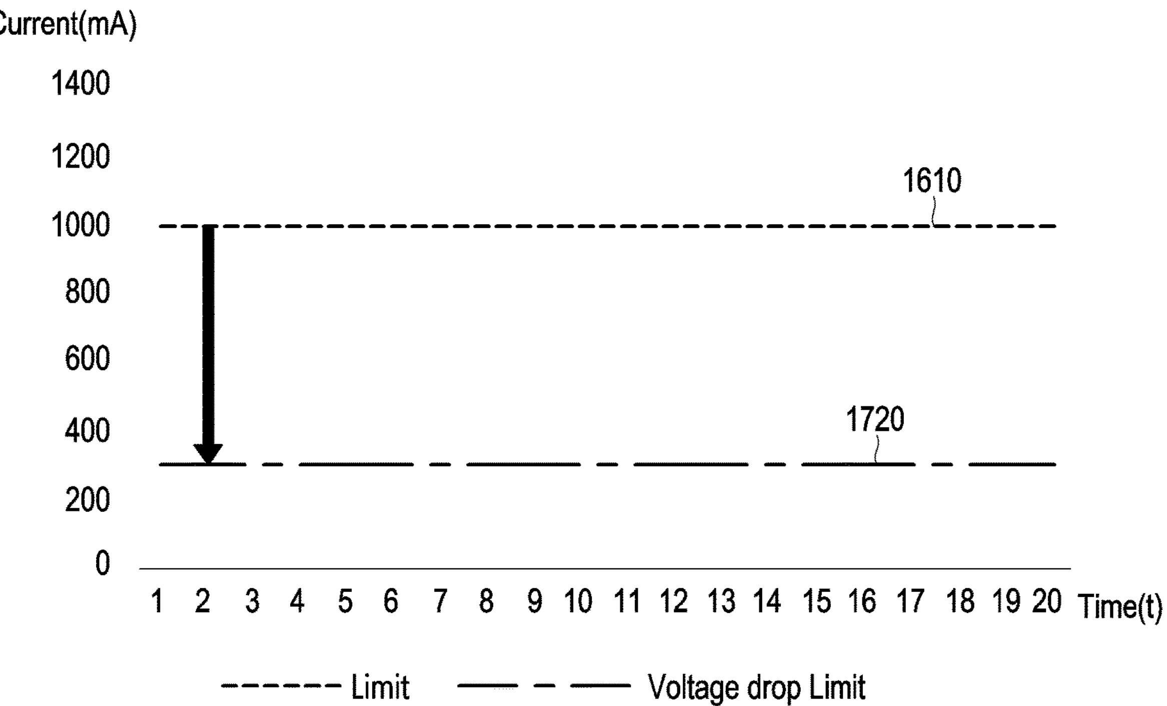
FIG. 17 is a diagram illustrating an example of adjusting a predefined discharge current value under battery performance deterioration conditions based on battery voltage drop according to various embodiments.

FIG. 17 is a diagram illustrating an example of adjusting a predefined discharge current value under battery performance deterioration conditions based on battery voltage drop according to various embodiments.

Referring to FIG. 17, the processor 420 according to an embodiment may use a predefined discharge current value 1610 in a normal mode (or the state in which battery performance deterioration conditions based on battery voltage drop are not satisfied). The battery performance deterioration conditions based on battery voltage drop according to an embodiment may be the case where the battery voltage falls to a specified voltage or below depending on the current used inside (or the system) of the electronic device 401. When the battery voltage falls to a specified voltage or below depending on the current used inside (or the system) of the electronic device 401, the processor 420 according to an embodiment may calculate a DC resistance value (e.g., the amount of system (or load) voltage drop at the time of measurement/system (or load) current at the time of measurement) of the battery 489, based on the amount of battery voltage drop, to obtain a third maximum allowable discharge current value 1720 (e.g., battery voltage drop-allowable voltage value (e.g., a voltage value for the system to operate stably without "sudden power off" even when an additional voltage drop occurs from the minimum of the system operation voltage range configured in the electronic device 410)/battery DC resistance value), change the predefined discharge current value 1610 to a third discharge current value 1720, and use the same. For example, when the minimum system operation voltage configured in the electronic device 410 is 3.5V and when the minimum margin for stable system operation is 3.2V, the processor 420 may identify 3.5V−3.2V=0.3V as the battery voltage drop-allowable voltage value, and obtain the value obtained by dividing the battery voltage drop-allowable voltage value by the battery DC resistance value as the third discharge current value 1720.

When the predefined discharge current value 1610 is changed to the third discharge current value 1720, the processor 420 according to an embodiment may perform control such that the discharge current value of the battery 489 does not exceed the third discharge current value 1720 when performing the haptic motor driving operation and the speaker output operation together (or simultaneously). For example, when the predefined discharge current value 1610 is changed to the third discharge current value 1720, the processor 420 may adjust the volume of the audio signals and/or the haptic motor driving voltage to be lower by a ratio at which the predefined discharge current value is changed (lowered) when performing the haptic motor driving operation and the speaker output operation together (or simultaneously), thereby preventing and/or reducing the discharge current value of the battery 489 from exceeding the third discharge current value 1720.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101 of FIG. 1, the electronic device 200 of FIGS. 2*a* and 2*b*, the electronic device 300 of FIG. 3, or the electronic device 401). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, a non-transitory storage medium according to an embodiment may store instructions which, when executed by at least one processor, individually and/or collectively, of an electronic device (e.g., the electronic device 101 in FIG. 1, the electronic device 200 in FIGS. 2A and 2B, the electronic device 300 in FIG. 3, or the electronic device 401 in FIG. 4), may cause the electronic device to perform at least one operation comprising: outputting, through a speaker (e.g., the audio output module 155 in FIG. 1 or the speaker 455 in FIG. 4), audio signals corresponding to audio data using audio circuitry (e.g., the audio circuitry 454 in FIG. 4), identifying, based on haptic signals being output concurrently with the output of the audio signals through the speaker, the audio signals to be output and the haptic signals to be output, estimating a discharge current value of a battery associated with the audio signals to be output concurrently with the output of the haptic signals to be output, based on the estimated discharge current value exceeding a specified discharge current value, adjusting volume associated with the audio signals to be output and/or a driving voltage for driving the haptic motor (e.g., the haptic module 179 in FIG. 1 or the haptic motor 479 in FIG. 4) in association with the haptic signals to be output such that the discharge current value of the battery due to the output of the audio signals and haptic signals does not exceed the specified discharge current value.

According to an embodiment, each element (e.g., module or program) of the above-described elements may include a single or multiple entities, and some of the multiple entities may be separately disposed in other elements. According to an embodiment, one or more of the elements or operations described above may be omitted, or one or more other elements or operations may be added thereto. Alternatively or additionally, a plurality of elements (e.g., modules or programs) may be integrated into a single element. In this case, the integrated element may perform one or more functions of each of the plurality of elements in the same or similar manner as that performed by the corresponding element of the plurality of elements that are not integrated. According to an embodiment, operations performed by modules, programs, or other elements may be executed sequentially, in parallel, iteratively, or heuristically, or one or more of the operations may be executed in a different sequence, omitted, or one or more other operations may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a battery;

a haptic motor;

a speaker;

haptic motor driving circuitry;

audio circuitry;

at least one processor, comprising processing circuitry; and memory storing instructions, wherein at least one processor, individually and/or collectively, is configured to execute the instructions and to cause the electronic device to:

output, through the speaker, audio signals corresponding to audio data using the audio circuitry, based on haptic signals to be output concurrently with output of audio signals through the speaker, identify the audio signals to be output and the haptic signals to be output, estimate a discharge current value of the battery associated with the audio signals to be output concurrently with output of the haptic signals, and based on the estimated discharge current value exceeding a specified discharge current value, adjust a volume associated with the audio signals to be output and/or a driving voltage for driving the haptic motor in association with the haptic signals to be output such that a discharge current value of the battery due to the output of the audio signals and the output of the haptic signals does not exceed the specified discharge current value.

2. The electronic device of claim 1, wherein at least one processor, individually and/or collectively, is configured to cause the electronic device to:

based on the estimated discharge current value exceeding the specified discharge current value, identify whether to adjust the volume, whether to adjust the driving voltage, or whether to adjust the volume and the driving voltage.

3. The electronic device of claim 1, wherein at least one processor, individually and/or collectively, is configured to cause the electronic device to:

adjust the volume using a specified volume control ratio.

4. The electronic device of claim 1, wherein at least one processor, individually and/or collectively, is configured to cause the electronic device to:

obtain the specified volume control ratio by dividing a value obtained by subtracting the maximum peak current value of a current to be provided to the haptic motor from the specified discharge current value of the battery by the maximum peak current value of the current to be provided to the speaker.

5. The electronic device of claim 1, wherein at least one processor, individually and/or collectively, is configured to cause the electronic device to:

adjust the volume using an inverted value of the current value to be provided to the haptic motor.

6. The electronic device of claim 1, wherein at least one processor, individually and/or collectively, is configured to cause the electronic device to:

adjust the volume using a specified volume limit value based on a current value to be provided to the haptic motor.

7. The electronic device of claim 1, wherein at least one processor, individually and/or collectively, is configured to cause the electronic device to:

adjust the driving voltage using a specified haptic motor driving voltage ratio.

8. The electronic device of claim 1, wherein at least one processor, individually and/or collectively, is configured to cause the electronic device to:

adjust the driving voltage using a specified haptic motor driving voltage limit value.

9. The electronic device of claim 1, wherein at least one processor, individually and/or collectively, is configured to cause the electronic device to:

adjust the driving voltage using an inverted volume of the volume associated with the audio signals to be output through the speaker.

10. The electronic device of claim 1, wherein at least one processor, individually and/or collectively, is configured to cause the electronic device to:

lower the specified discharge current of the battery by a specified value based on a specified condition.

11. A method of controlling audio output and a haptic motor in an electronic device, the method comprising:

outputting, through a speaker, audio signals corresponding to audio data using audio circuitry;

identifying, based on haptic signals being output concurrently with the output of the audio signals through the speaker, the audio signals to be output and the haptic signals to be output;

estimating a discharge current value of a battery associated with the audio signals to be output concurrently with the output of the haptic signals to be output; and based on the estimated discharge current value exceeding a specified discharge current value, adjusting volume associated with the audio signals to be output and/or a driving voltage for driving the haptic motor in association with the haptic signals to be output such that the discharge current value of the battery due to the output of the audio signals and haptic signals does not exceed the specified discharge current value.

12. The method of claim 11, further comprising:

based on the estimated discharge current value exceeding the specified discharge current value, selecting whether to adjust the volume, the driving voltage, or the volume and the driving voltage.

13. The method of claim 11, further comprising:

adjusting the volume using a specified volume control ratio.

14. The method of claim 11, further comprising:

obtaining the specified volume control ratio by dividing a value, obtained by subtracting the maximum peak current value of a current to be provided to the haptic motor from the specified discharge current value, by the maximum peak current value of a current to be provided to the speaker.

15. The method of claim 11, further comprising:

adjusting the volume using an inverted value of a current value to be provided to the haptic motor.

16. The method of claim 11, further comprising:

adjusting the volume using a specified volume limit value, based on a current value to be provided to the haptic motor.

17. The method of claim 11, further comprising:

adjusting the driving voltage using a specified haptic motor driving voltage ratio.

18. The method of claim 11, further comprising:

adjusting the driving voltage using a specified haptic motor driving voltage limit value.

19. The method of claim 11, further comprising:

adjusting the driving voltage using an inverted volume of the volume associated with the audio signals to be output.

20. A non-transitory computer-readable storage medium storing instructions that, when executed by at least one processor, individually and/or collectively, of an electronic device, cause the electronic device to perform at least one operation, wherein the at least one operation comprises:

outputting, through a speaker, audio signals corresponding to audio data using audio circuitry;

identifying, based on haptic signals being output concurrently with the output of the audio signals through the speaker, the audio signals to be output and the haptic signals to be output;

estimating a discharge current value of a battery associated with the audio signals to be output concurrently with the output of the haptic signals to be output; and based on the estimated discharge current value exceeding a specified discharge current value, adjusting volume associated with the audio signals to be output and/or a driving voltage for driving the haptic motor in association with the haptic signals to be output such that the discharge current value of the battery due to the output of the audio signals and haptic signals does not exceed the specified discharge current value.

* * * * *